US007848246B2

(12) United States Patent
Kim et al.

(10) Patent No.: US 7,848,246 B2
(45) Date of Patent: Dec. 7, 2010

(54) METHOD AND SYSTEM FOR CONFIRMING CONNECTION OF LAYER-1 LABEL SWITCHED PATH(L1-LSP) IN GMPLS-BASED NETWORK

(75) Inventors: Young Hwa Kim, Daejeon (KR); Kwangjoon Kim, Daejeon (KR)

(73) Assignee: Electronics and Telecommunications Research Institute (KR)

( * ) Notice: Subject to any disclaimer, the term of this patent is extended or adjusted under 35 U.S.C. 154(b) by 390 days.

(21) Appl. No.: 11/904,178

(22) Filed: Sep. 26, 2007

(65) Prior Publication Data

US 2008/0095171 A1 Apr. 24, 2008

(30) Foreign Application Priority Data

Oct. 19, 2006 (KR) ............... 10-2006-0102039

(51) Int. Cl.
*H04J 1/16* (2006.01)
(52) U.S. Cl. .................. 370/248; 370/241; 370/249
(58) Field of Classification Search .......... 370/241–253
See application file for complete search history.

(56) References Cited

U.S. PATENT DOCUMENTS

| | | | |
|---|---|---|---|
| 6,219,829 B1* | 4/2001 | Sivakumar et al. | 717/131 |
| 6,501,756 B1* | 12/2002 | Katsube et al. | 370/392 |
| 6,970,924 B1* | 11/2005 | Chu et al. | 709/224 |
| 7,372,833 B2* | 5/2008 | Kyronaho et al. | 370/331 |
| 2002/0099773 A1* | 7/2002 | Tsuru | 709/204 |
| 2003/0198235 A1* | 10/2003 | Weldon et al. | 370/401 |
| 2005/0259587 A1* | 11/2005 | Wakumoto et al. | 370/248 |
| 2005/0281392 A1* | 12/2005 | Weeks et al. | 379/22 |
| 2006/0018313 A1* | 1/2006 | Oki et al. | 370/389 |
| 2006/0083251 A1 | 4/2006 | Kataoka et al. | |
| 2007/0053359 A1* | 3/2007 | Wu et al. | 370/392 |
| 2007/0274332 A1* | 11/2007 | De Vega Rodrigo et al. | 370/412 |

FOREIGN PATENT DOCUMENTS

| | | |
|---|---|---|
| KR | 10-1998-0038772 | 4/2000 |
| KR | 1020060066992 A | 6/2006 |

OTHER PUBLICATIONS

Baccala, Brent. Connected: An Internet Encyclopedia. <http://web.archive.org/web/20030625010652/http://www.freesoft.org/CIE/Topics/53.htm>. Jun. 25, 2003.*
Awduche, D. et al. RSVP-TE: Extensions to TSVP for LSP Tunnels. Dec. 2001. Network Working Group. RFC 3209.*
J. Lang, Ed., Sonos, Inc. Oct. 2005, "Link Management Protocol (LMP)", Network Working Group, Request for Comments: 4204, Category: Standards Track (pp. 1-86), Oct. 2005.
International Telecommunication Union, "Protocol for automatic discovery in SDH and OTN networks", ITU-T, G.7714.1/Y.1705.1, Telecommunication Standardization Sector of ITU (Apr. 2003), Series G: Transmission Systems and Media, Digital Systems and Networks; Series Y: Global Information Infrastructure and Internet Protocol Aspects.

* cited by examiner

*Primary Examiner*—William Trost, IV
*Assistant Examiner*—Ashil Farahmand
(74) *Attorney, Agent, or Firm*—Blakely, Sokoloff, Taylor & Zafman

(57) ABSTRACT

Provided is a method and system for confirming label switched path (LSP) connection in a global multi-protocol label switching (GMPLS)-based network. The method includes: collecting LSP hierarchy information; selecting one of a plurality of paths between first and second clients according to the LSP hierarchy information; and confirming the connection of the selected path.

9 Claims, 26 Drawing Sheets

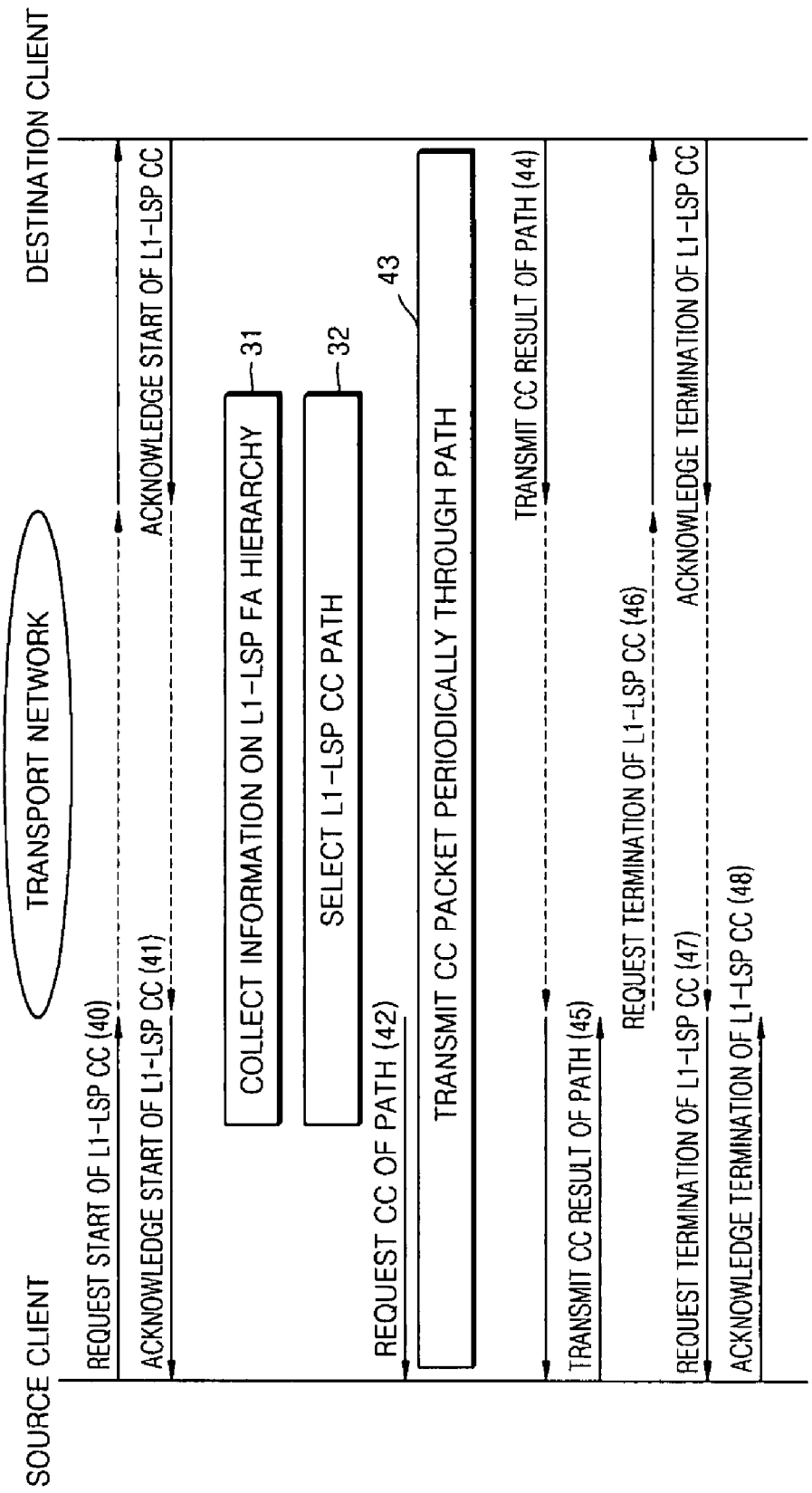

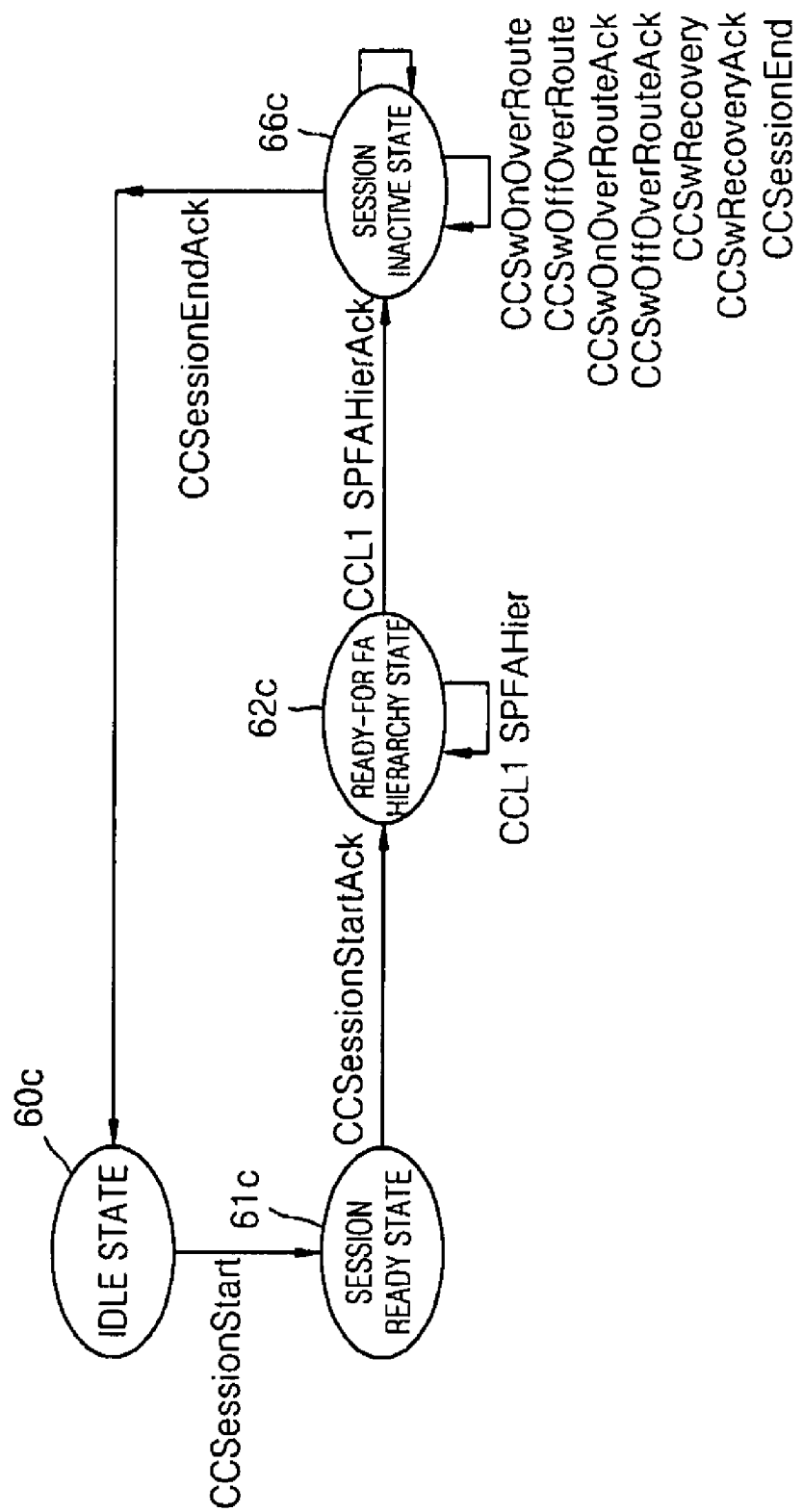

METHOD AND SYSTEM FOR CONFIRMING CONNECTION OF LAYER-1 LABEL SWITCHED PATH(L1-LSP) IN GMPLS-BASED NETWORK

CROSS-REFERENCE TO RELATED PATENT APPLICATION

This application claims the benefit of Korean Patent Application No. 10-2006-0102039, filed on Oct. 19, 2006, in the Korean Intellectual Property Office, the disclosure of which is incorporated herein in its entirety by reference.

BACKGROUND OF THE INVENTION

1. Field of the Invention

The present invention relates to a method and system for confirming label switched path (LSP) connection in a global multi-protocol label switching (GMPLS)-based network, and more particularly, to a method and system which dynamically confirms physical layer—or layer 1 (L1)—LSP connection in order to verify an end-to-end path of the physical layer in a GMPLS-based network without depending on a predetermined transport technique.

This work was supported by the IT R&D program of MIC/IITA. [2006-S-059-01, ASON based Metro Photonic Cross-Connect Technology]

2. Description of the Related Art

Global multi-protocol label switching (GMPLS) provides a control plane by extending an efficient label switching mechanism of MPLS to a physical network layer so that a network can utilize an infrastructure including high speed links. With the introduction of the GMPLS concept, communication devices providing only a transport function in a backbone network are being evolved to provide a switching function. To this end, an Internet protocol (IP)-based signaling protocol is used to support circuit switching of a time slot, a wavelength, and a fiber itself. In practice, when troubles occur after user traffics are switched, the set physical layer circuits are manually confirmed using test devices to detect any problems on the current path. This means that the dynamic connection confirmation cannot be performed for the set L1-LSP.

However, it is hardly said that there does not exist any method of confirming data link connection. For example, there is a method using a link management protocol of the Internet engineering task force (IETF) itself or associating the IETF link management protocol with a neighbor discovery protocol of the international telecommunication union-telecommunication standardization sector (ITU-T). These two methods are valid only in a network using a specific transport technique, and thus cannot be used in a network into which several transport techniques are converged, for example, a network having various LSP hierarchies such as time-division multiplexing capable (TDM) LSP, lambda switch capable (LSC) LSP, and fiber switch capable (FSC) LSP. A connection confirmation using these methods is performed for a physical link in a network based on a synchronous digital hierarchy (SDH) or an optical transport network (OTN). The connection confirmation is performed using a trail trace byte of J0 or J1 of the SDH network in the method associating with the neighbor discovery protocol of the ITU-T, and is performed using a trail trace byte called a trail trace identifier in an OTN network. Moreover, since the connection confirmation is not performed on the LSP transmitting the user traffics but performed using an overhead channel in the method associating with the neighbor discovery protocol of the ITU-T, L1-LSP connection cannot be confirmed where the L1-LSP is set according to the signaling protocol.

SUMMARY OF THE INVENTION

The present invention provides a method and system that a network administrator or protocol machine can dynamically confirm connection through the interaction of clients and network nodes in a global multi-protocol label switching (GMPLS)-based network in order to verify an end-to-end path of a preset L1-LSP without depending on a specific transport technique.

According to an aspect of the present invention, there is provided a method for confirming label switched path (LSP) connection in a global multi-protocol label switching (GMPLS)-based network, the method comprising: collecting LSP hierarchy information; selecting one of a plurality of paths between first and second clients according to the LSP hierarchy information; and confirming connection for the selected path.

According to another aspect of the present invention, there is provided a system for confirming label switched path (LSP) connection in a global multi-protocol label switching (GMPLS)-based network. The system comprises first and second clients connected to the GMPLS-based network, wherein a first node of the network nodes collects LSP hierarchy information when an LSP connection confirmation is requested in the GMPLS-based network, selects one of a plurality of paths between the first and second clients according to the LSP hierarchy information, and performs the connection confirmation for the selected path.

According to still another aspect of the present invention, there is provided a method for confirming LSP (label switched path) connection by a source client in a GMPLS (global multi-protocol label switching)-based network through which the source client and a destination client are connected, the method comprising transiting to a session ready state when receiving a message requesting a connection confirmation in an idle state; transmitting an acknowledgement message for the message requesting the connection confirmation to the GMPLS network in the session ready state and transiting to a ready-for FA (forwarding adjacency) hierarchy state; transiting to a session active state when receiving a message requesting a collection of information on the LSP in the session ready state or the ready-for FA hierarchy state; opening or closing input/output labels and transiting to an instance ready state when receiving a first message a first message requesting switching control for labels in the session active state; transiting to an instance active state when receiving a message requesting preparation of the connection confirmation in the instance ready state; transmitting a result of the connection confirmation to the GMPLS network when receiving a packet for the connection confirmation in the instance active state.

According to still another aspect of the present invention, there is provided a method for A method of confirming LSP (label switched path) connection by a first network node connected to a source client of network nodes included in a GMPLS (global multi-protocol label switching)-based network through which the source client and a destination client are connected, the method comprising: transiting to a session ready state when receiving a message requesting a connection confirmation in an idle state; transmitting a message requesting collection of information on the LSP to a direction of a second network node connected to the destination client in the session ready state and then transiting to a ready-for FA (forwarding adjacency) hierarchy state; selecting a path for the connection confirmation in the ready-for FA hierarchy state, transmitting a message which requests switching control for labels associated with the connection confirmation for the selected path, to the second network node direction and transiting to a session active state; checking an IP (Internet protocol) address of the destination client, transmitting a message requesting preparation of the connection confirmation to the destination client, and transiting to an instance ready state, when receiving a first message for acknowledging the request for switching control for labels associated with the selected path from the source client in the session active state; transiting to an instance active state when receiving a message for acknowledging the preparation of the connection confirmation in the instance ready state; and checking an IP address of the destination client and transmitting a result of the connection confirmation to the destination client when receiving the result of the connection confirmation in the instance active state.

According to still another aspect of the present invention, there is provided a method for confirming LSP (label switched path) connection by network nodes included in a GMPLS (global multi-protocol label switching)-based network through which a source client and a destination client are connected, the method comprising: transiting to a session ready state when receiving a message requesting a connection confirmation in an idle state; transiting to a ready-for FA (forwarding adjacency) hierarchy state when receiving an acknowledgement message in response to the message requesting the connection confirmation in the session ready state; checking FA hierarchy information and transiting to a session inactive state when receiving an acknowledgement message for a request for collecting information on the LSP in the session ready state or the ready-for FA hierarchy state; and when receiving a message for requesting switching control for the connection confirmation from a first network node connected to the source client in the session inactive state, checking whether one receiving the message is a second network node connected to the destination client and transmitting the message for requesting switching control for the connection confirmation to the destination client if checked to be the second network node.

According to still another aspect of the present invention, there is provided a method for A method of confirming LSP (label switched path) connection by a destination client in a GMPLS (global multi-protocol label switching)-based network through which a source client and the destination client are connected, the method comprising: transiting to a session ready state when receiving a message requesting a connection confirmation in an idle state; transiting to a session inactive state when receiving a message requesting collection of information on the LSP in the session ready state; opening or closing input/output labels and transiting to an instance ready state if receiving a first message, which requests switching control for the connection confirmation, in the session inactive state; transiting to an instance inactive state when receiving a message which requests preparation of the connection confirmation in the instance ready state; when receiving a packet for the connection confirmation in the instance inactive state, checking an IP (Internet protocol) address of the source client and transmitting a message acknowledging reception of the packet for a predetermined number of times to the source client.

BRIEF DESCRIPTION OF THE DRAWINGS

The above and other features and advantages of the present invention will become more apparent by describing in detail exemplary embodiments thereof with reference to the attached drawings in which:

FIG. 4A is a flowchart of a method of confirming L1-LSP connection when a source client requests a connection confirmation;

FIGS. 6A to 6D are state transition diagrams of respective nodes when an L1-LSP connection confirmation is dynamically performed;

DETAILED DESCRIPTION OF THE INVENTION

Exemplary embodiments of the present invention will now be described in detail with reference to the accompanying drawings.

Figure 1:
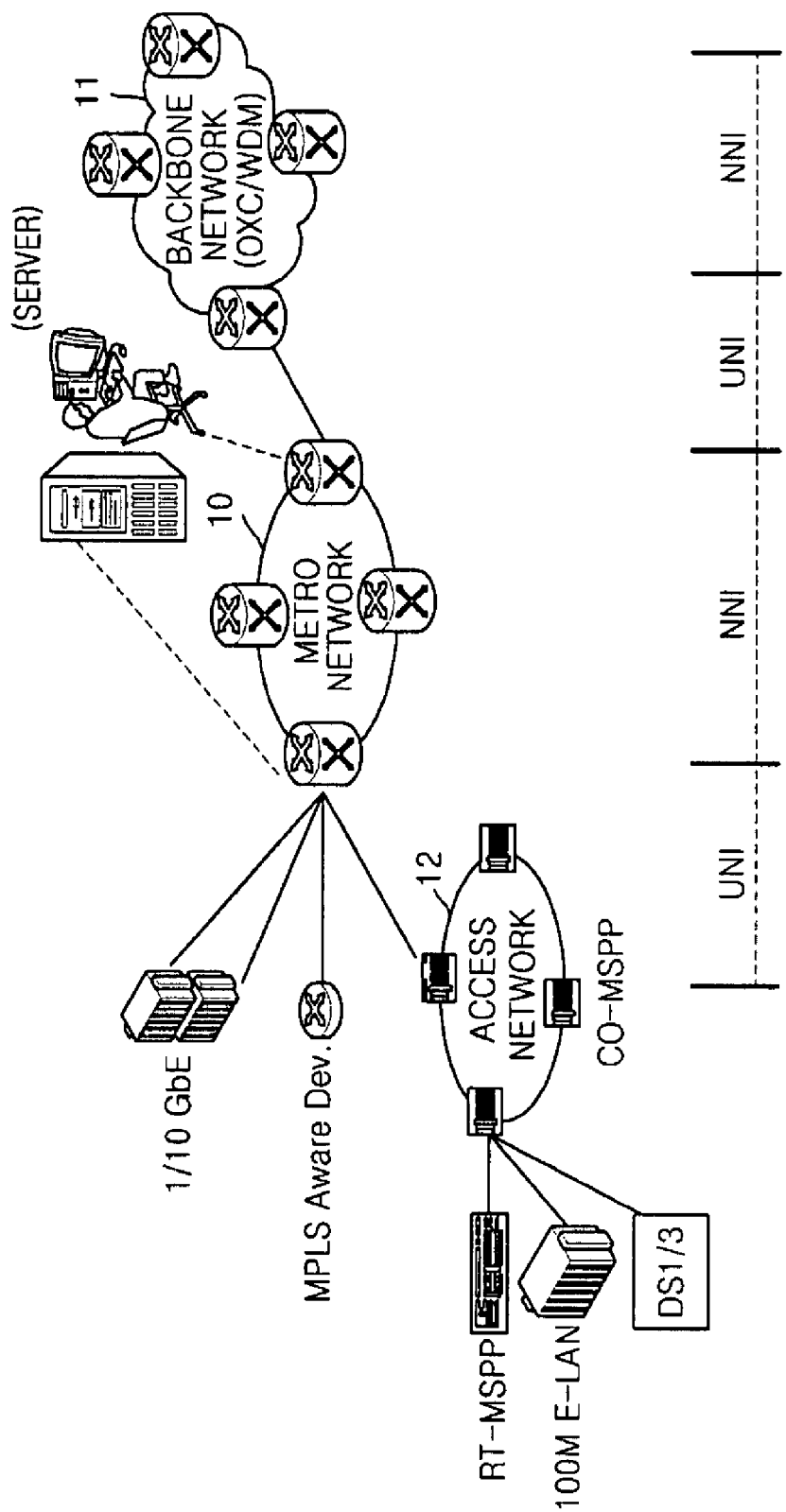
FIG. 1 is a schematic view of a global multi-protocol label switching (GMPLS)-based network.

FIG. 1 is a schematic view of a global multi-protocol label switching (GMPLS)-based network. Referring to FIG. 1, the GMPLS-based network includes a metro network 10, a backbone network 11, and an access network 12 which are interconnected with one another. The metro network 10 includes medium-sized routers. The access network 12 switches dependent signals and includes a non-MPLS (or MPLS) router, an Ethernet switch, and a remote terminal/central office terminal-multi service provisioning platform (RT/COT-MSPP). The backbone network 11 switches main signals and includes an optical link distribution system such as an optical cross connect (OXC). From a viewpoint of an interface between network nodes, an optical Internet control plane may be divided into a user-to-network interface (UNI) and a network-to-network interface (NNI) under the provisions of the international telecommunications union-telecommunication standardization sector (ITU-T). The UNI controls automatic connection through a control plane between an automatic switched transport network (ASTN) and a client. An external-NNI (E-NNI) is an interface between network providers in the ASTN. An internal-NNI (I-NNI) is an interface between control plane entities in a network provider.

When a device connected to the access network 12, e.g. RT-MSPP, becomes a client, the access network 12 and the metro network 10 correspond to a transport network. On the other hand, when a device connected to the metro network 10, e.g. 1/10 GbE, the backbone network 11 corresponds to the transport network.

To the other side of the backbone network 11 may be the second metro network (not shown) and/or the second access network (not shown) be connected. The source client connected to the metro network 10 or access network 12 may communicate with a destination client connected to the second metro network or the second access network through the transport network.

Figure 2:
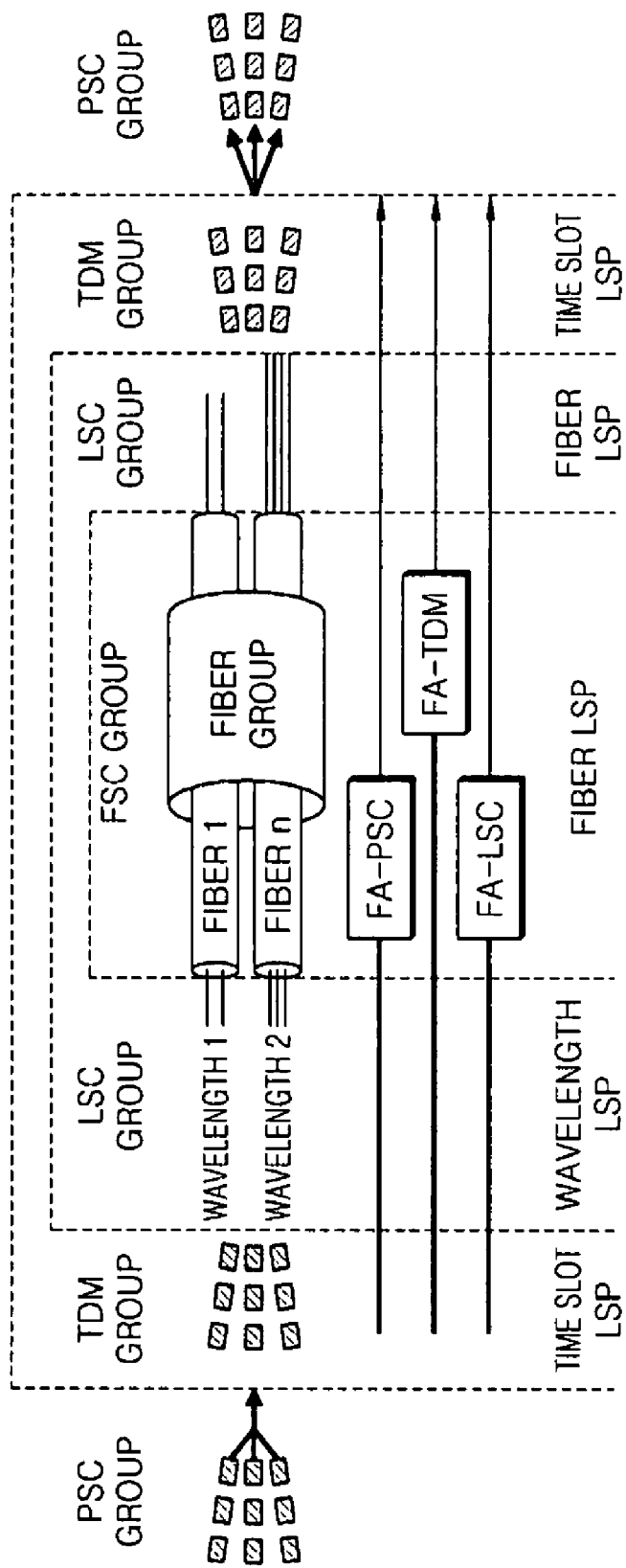
FIG. 2 illustrates a layer 1 (L1)-label switched path (LSP) hierarchy employed in the present invention.

FIG. 2 illustrates a layer 1 (L1)-label switched path (LSP) hierarchy employed in the present invention.

GMPLS control is generally performed for a physical layer, that is, L1. Referring to FIG. 2, various transport techniques may be used together in the L1 network structure. For example, a technique can be employed that signals are multiplexed with respect to a link bandwidth in an order of packet switch capable (PSC), time-division multiplexing (TDM) capable, lambda switch capable (LSC) and fiber switch capable (FSC), and then demultiplexed in the reverse order. Thus, an LSP, formed by switching the transport components, has a hierarchy of a TDM LSP, a lambda LSP, and a fiber LSP according to a connection scheme. Here, a process of identifying LSP of the physical layer is called Forwarding adjacency (FA). The present invention provides a method of dynamically confirming L1-LSP connection through an interaction of the UNI and NNI.

Figure 3:
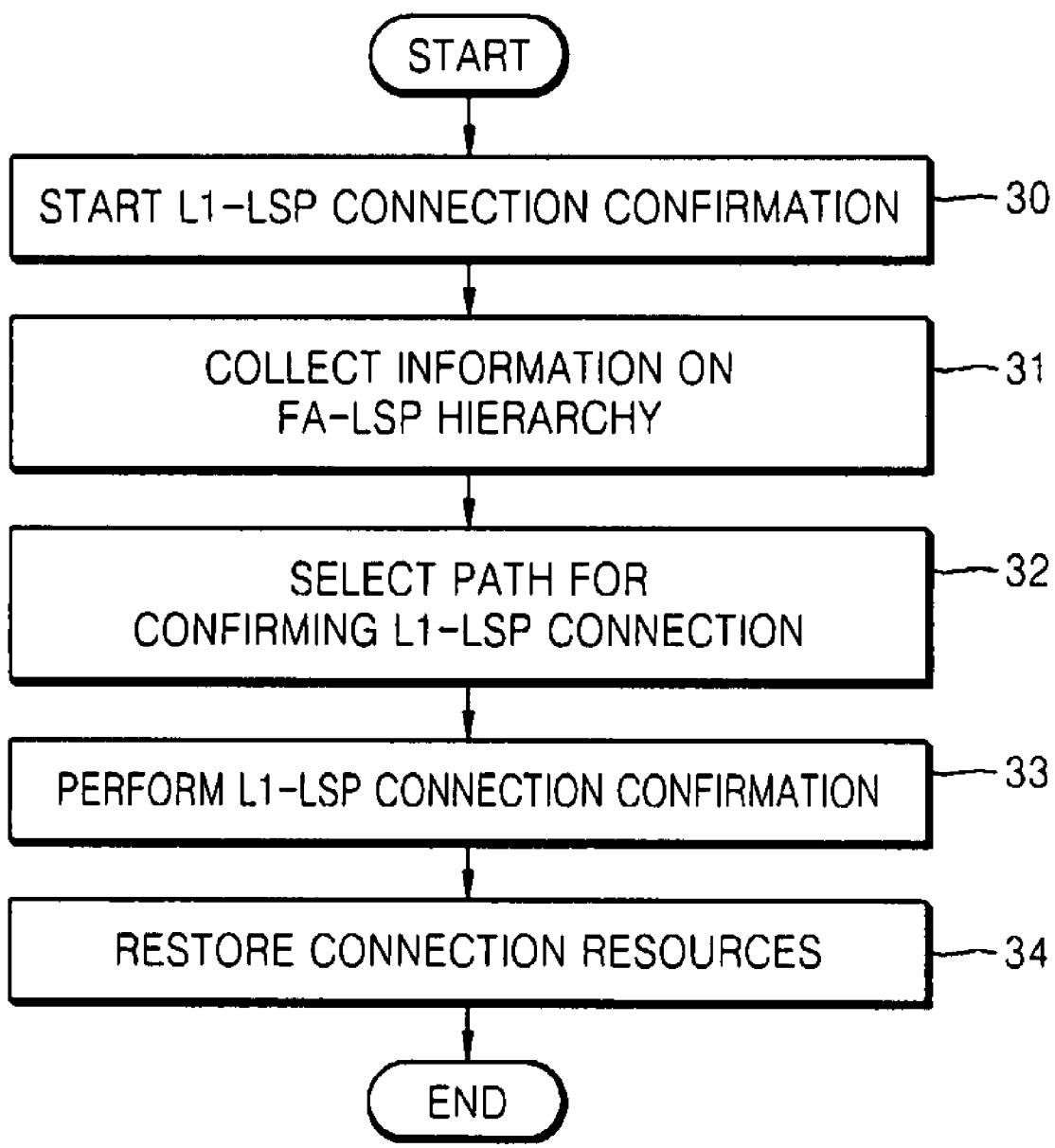
FIG. 3 is a flowchart of a method of confirming L1-LSP connection according to an embodiment of the present invention.

FIG. 3 is a flowchart of a method of confirming L1-LSP connection according to an embodiment of the present invention. First, a client or a network node requests the L1-LSP connection confirmation (operation 30). In response to the request, the network node collects information on an FA-LSP hierarchy inside the network, which may be constructed of a TMD, an LSC, and an FSC (operation 31). Next, the network node selects a path from a plurality of data links forming a LSP on a basis of the information on the FA-LSP hierarchy (operation 32). The network node transmits and receives connection confirmation packets through the selected path, and thus checks the connection of the path (operation 33). Operations 32 and 33 may be repeated for a plurality of the data links of the L1-LSP. On the completion of the connection confirmation for the data links, connection resources are recovered to their initial states prior to the start of the connection confirmation of L1-LSP (operation 34), thereby ending the connection confirmation.

FIG. 4A is a flowchart of a method of confirming L1-LSP connection when a source client requests a connection confirmation.

First, the source client requests a destination client to start an L1-LSP connection confirmation (hereinafter referred to as CC) (operation 40). The destination client acknowledges the start of L1-LSP CC (operation 41). As described in operations 31 and 32 of FIG. 3, a network node collects information on an L1-LSP FA hierarchy and selects an L1-LSP CC path.

Upon the completion of path selection, the network node requests the source client to perform CC on the path (operation 42). The source client periodically transmits a CC packet to the destination client (operation 43). In response to the CC packet, the destination client transmits a CC result of the path to the source client (operation 44). The source client transmits the CC result for the path to the network node (operation 45). In response thereto, the network node requests the destination client to end L1-LSP CC (operation 46). The destination client acknowledges the end of L1-LSP CC to the network node and then the network node re-requests the source client to end L1-LSP CC (operation 47). The source client acknowledges the end of L1-LSP CC to the network node and the whole CC procedure ends.

Figure 4B:
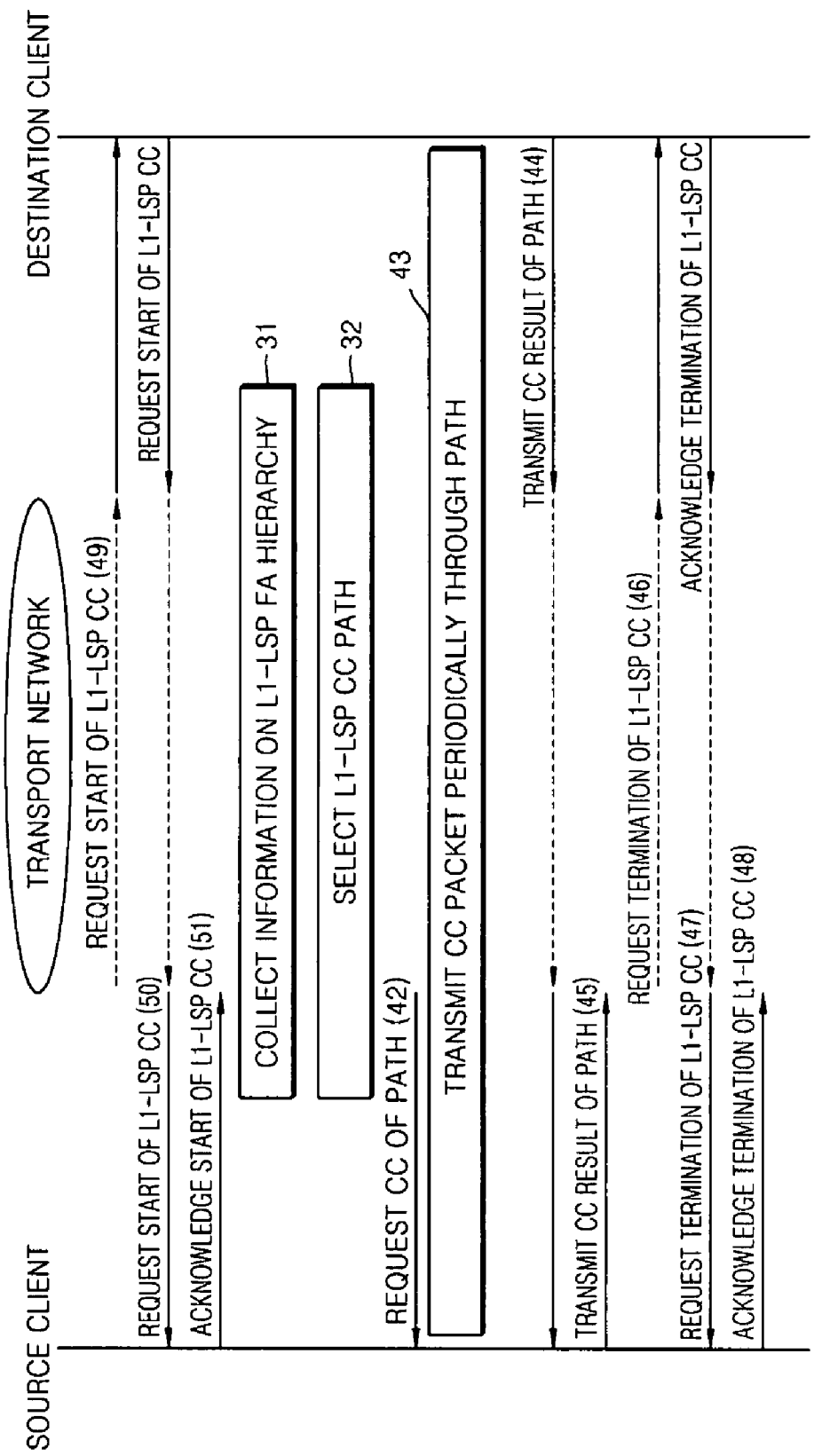
FIG. 4B is a flowchart of a method of confirming L1-LSP connection when a network node requests a connection confirmation.

FIG. 4B is a flowchart of an L1-LSP CC method when a network node requests a CC. In FIG. 4B, reference numerals equivalent with the ones in FIG. 4A denote equivalent operations, except for an operation of requesting and acknowledging the start of L1-LSP CC. Referring to FIG. 4B, in operation 49, the network node requests a destination client to start L1-LSP CC. The destination client acknowledges the start of L1-LSP CC to the network node and the network node re-requests the source client to start L1-LSP CC (operation 50). The source client acknowledges the start of L1-LSP CC to the network node (operation 51). The remaining operations are the same as those illustrated in FIG. 4A.

The Table below defines messages transmitted and received in order to confirm connection between the source client, the network node, and the destination client.

TABLE 1

| Message | Function |
| --- | --- |
| CCSessionStart | request CC session start |
| CCSessionStartAck | acknowledge request of CC session start |
| CCSessionEnd | request CC session end |
| CCSessionEndAck | acknowledge request of CC session end |
| CCInstanceReady | request CC instance ready |
| CCInstanceReadyAck | acknowledge request of CC instance ready |
| CCInstanceResult | transmit CC instance result |
| CCInstanceResultAck | acknowledge reception of CC instance result |
| CCInstanceStatus | report reception of CC packet |
| CCSwOnOverRoute | request for switching control (on) of associated labels to perform CC over route |
| CCSwOnOverRouteAck | acknowledge request for switching control (on) of associated labels to perform CC over route |
| CCSwOffOverRoute | request for switching control (off) of associated labels to perform CC over route |
| CCSwOffOverRouteAck | acknowledge request for switching control (off) of associated labels to perform CC over route |
| CCSwRecovery | request recovery to initial state prior to CC session start |

TABLE 1-continued

| Message | Function |
| --- | --- |
| CCSwRecoveryAck | acknowledge request of recovery to initial state prior to CC session start |
| ContinuityCheck | packet transmitted through data link during CC |
| CCL1LSPFAHier | request to collect L1-LSP information |
| CCL1LSPFAHierAck | acknowledge request of collecting L1-LSP information |

Messages of Table 1 may be classified into a session control message group, an instance control message group, a switch control message group, and a miscellaneous message group.

The session control message group includes CCSessionStart, CCSessionStartAck, CCSessionEnd, and CCSessionEndAck. The instance control message group includes CCInstanceReady, CCInstanceReadyAck, CCInstanceResult, CCInstanceResultAck, and CCInstanceStatus. The switch control message group includes CCSwOnOverRoute, CCSwOnOverRouteAck, CCSwOffOverRoute, CCSwOffOverRouteAck, CCSwRecovery, and CCSwRecoveryAck. The miscellaneous message group includes ContinuityCheck, CCL1LSPFAHier, and CCL1LSPFAHierAck. These messages may be implemented in various manners according to protocol formats. For example, if the present invention is applied to an extended signaling protocol, the messages can be implemented according to the corresponding signaling protocol, for example within a format of messages and objects of GMPLS RSVP-TE.

Figure 5A:
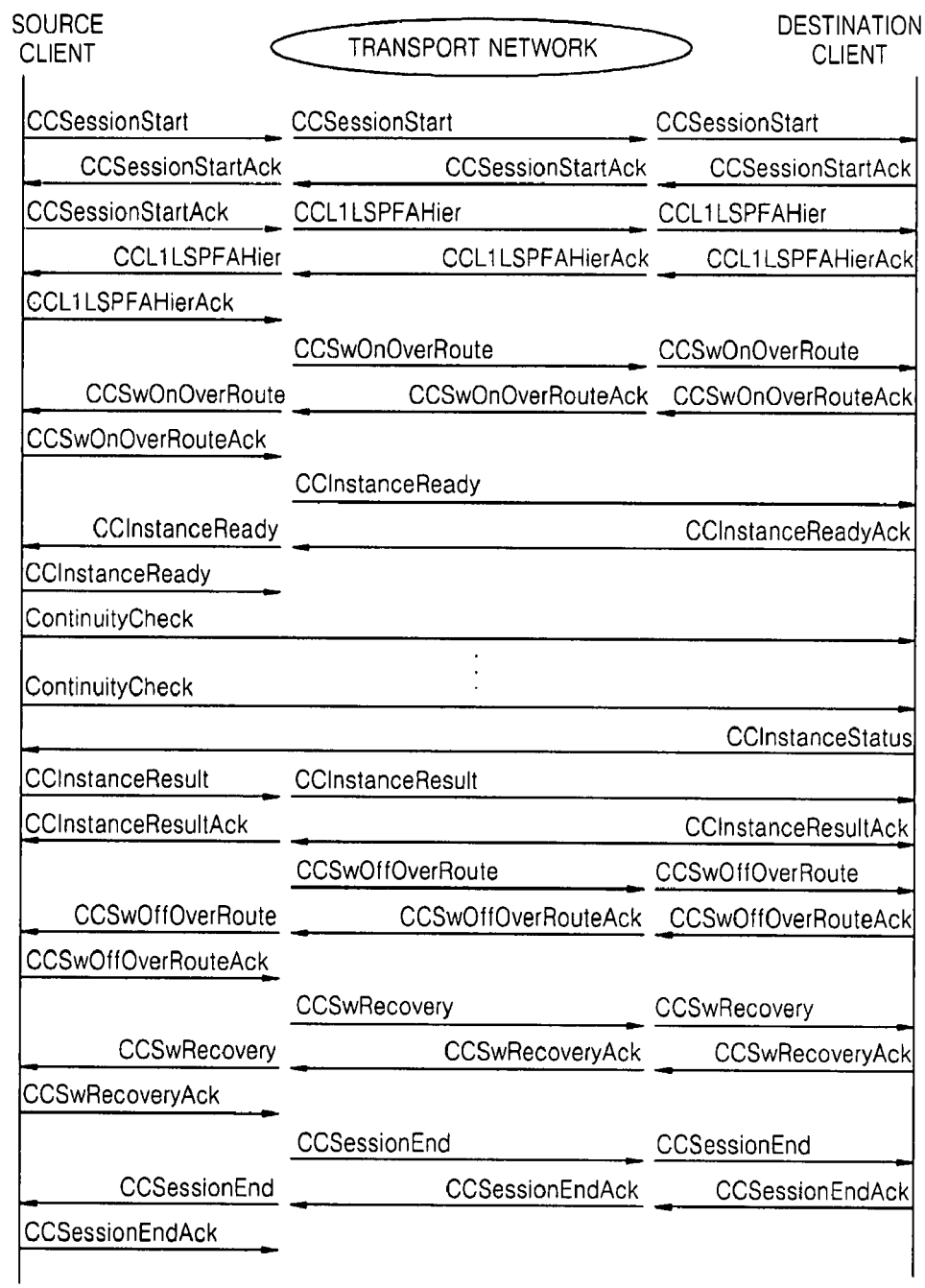
FIGS. 5A and 5B are detailed flowcharts of FIGS. 4A and 4B with reference to messages defined in Table 1.
Figure 5B:
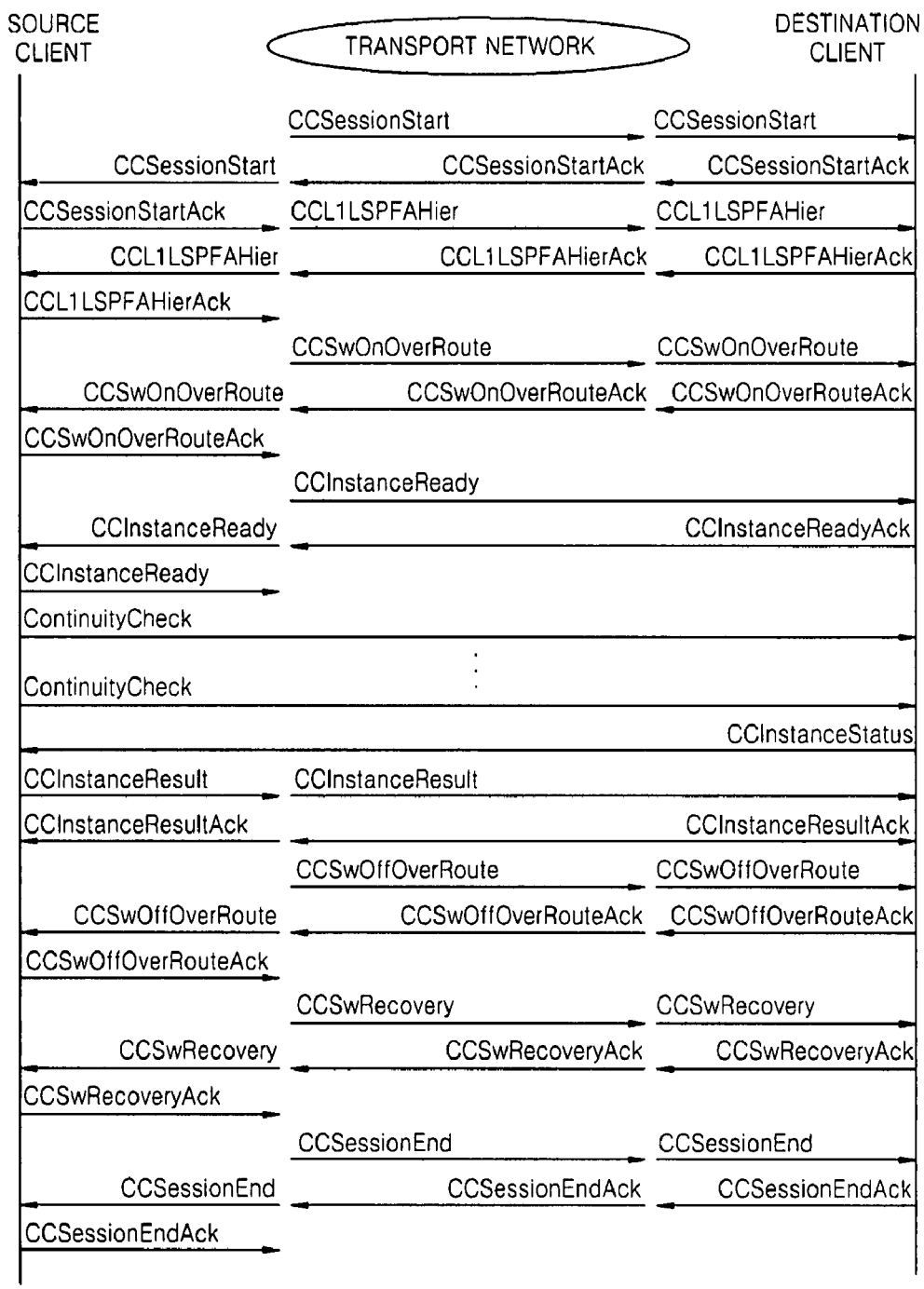

FIGS. 5A and 5B are detailed flowcharts of FIGS. 4A and 4B with reference to messages defined in Table 1.

Upon the start of CC, a source client or a network node exchanges CCSessionStart and CCSessionStartAck messages so as to start a CC session in an operation of starting L1-LSP CC, and also exchanges CCL1LSPFAHier and CCL1LSPFAHierAck messages in an operation of collecting information on an FA-SLP hierarchy. In an operation of selecting an L1-LSP CC route, the source client or the network node exchanges CCSwonOverRoute and CCSwOnOverRouteAck messages, and in an operation of performing L1-LSP CC also exchanges CCinstanceReady, CCInstanceReadyAck, CCInstanceResult, CCInstanceResultAck, CCInstanceStatus, and CountinuityCheck messages. Hereafter, in order to end CC for a specific data link, CCSwOffOverRoute and CCSwOverRouteAck messages are exchanged. In an operation of ending L1-LSP CC for all data links, CCSwRecovery and CCSwRecoveryAck messages are exchanged so that connection resources are recovered to their initial state prior to the CC session start. In addition, the source client or the network node exchanges CCSessionEnd and CCSessionEndAck messages so as to end the CC session.

FIGS. 6A to 6D are state transition diagrams of respective nodes according to the dynamic L1-LSP CC. Referring back to FIG. 1, if a client and a network node are divided with a boundary of a UNI, a UNI of the client is defined as a UNI-C, and a UNI of the network node is defined as a UNI-N. The UNI-C transmitting a ContinuityCheck packet for the CC becomes an active UNI-C (a-UNI-C), whereas the UNI-C receiving the ContinuityCheck packet becomes a passive UNI-C (p-UNI-C). As for the UNI-N, a UNI-N node adjacent to the a-UNI-C becomes an active UNI-N (a-UNI-N), and a UNI-N node adjacent to the p-UNI-C becomes a passive UNI-N (p-UNI-N). A network is constructed of a chain of NNIs. Therefore, in the present embodiment, the client and the network nodes operates based on the state transition diagrams of FIGS. 6A to 6D according to exchanges of messages while each of them functions as a-UNI-C, a-UNI-N, p-UNI-N, or p-UNI-C.

Figure 6A:
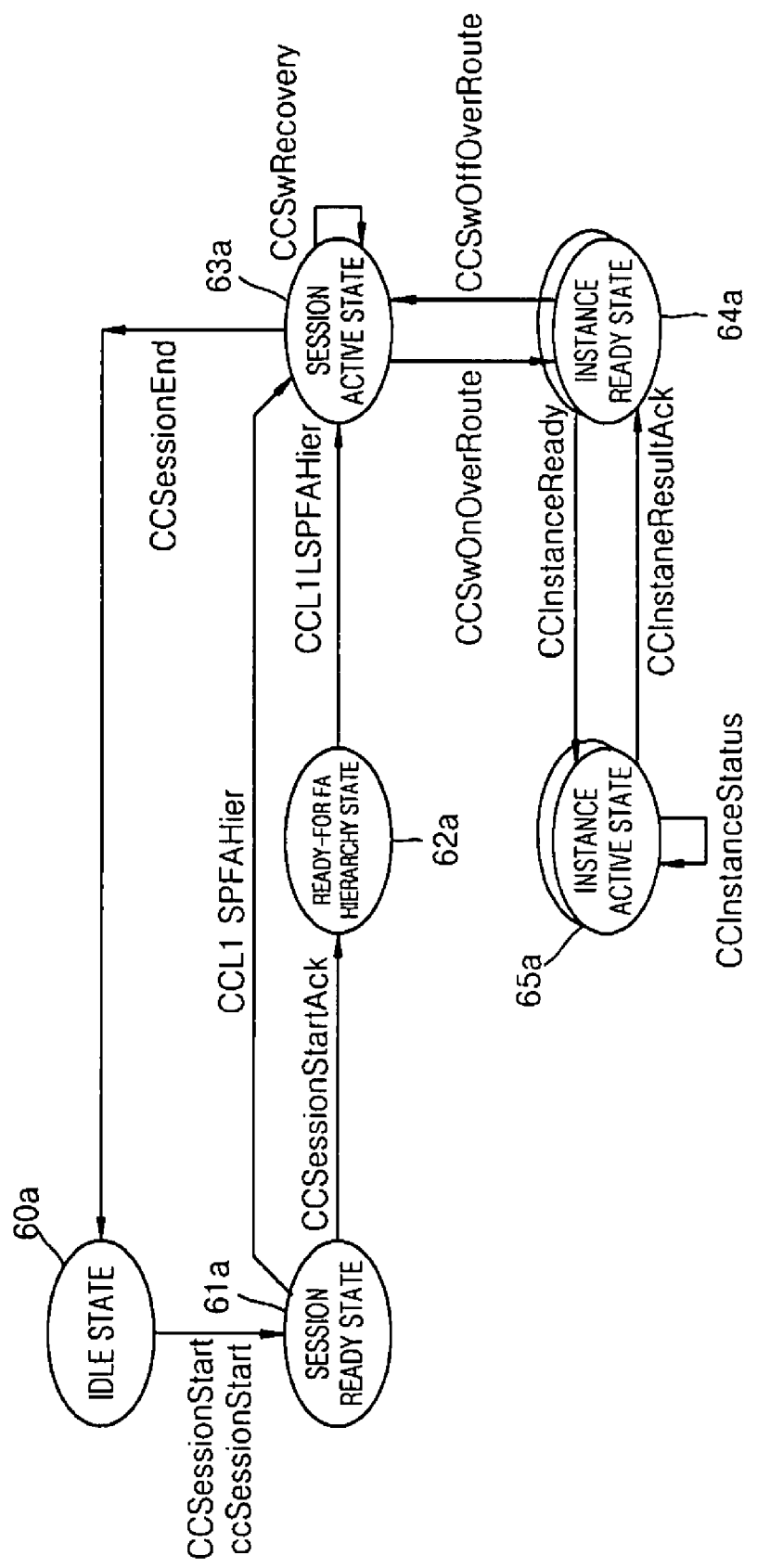

FIG. 6A is a state transition diagram of the a-UNI-C. Referring to FIG. 6A, the a-UNI-C includes an idle state 60a, a session ready state 61a, a ready-for FA hierarchy state 62a, a session active state 63a, an instance ready state 64a, and an instance active state 65a.

In the idle state 60a, the a-UNI-C transits to the session ready state 61a when receiving CCSessionStart or ccSessionStart message. Unlike the messages defined in Table 1, ccSessionStart is a CC start request event that is generated by a node itself.

In the session ready state 61a, the a-UNI-C transits to the ready-for FA hierarchy state 62a after transmitting CCSessionStartAck message or transits to the session active state 63a after receiving CCL1LSPFAHier message. In addition, the a-UNI-C also transits to the session active state 63a after receiving CCL1LSPFAHier message while in the ready-for FA hierarchy state 62a. While in the session active state 63a, the a-UNI-C remains unchanged when receiving CCSwRecovery message or transits to the idle state 60a when receiving CCSessionEnd message. In the session active state 63a, the a-UNI-C transits to the instance ready state 64a when receiving CCSwOnOverRoute message. In the instance ready state 64a, the a-UNI-C returns to the session active state 63a when receiving CCSwOffOverRoute message. When receiving CCInstanceReady message in the instance ready state 64a, the a-UNI-C transits to the instance active state 65a. In the instance active state 65a, the a-UNI-C remains the current state when receiving CCInstanceStatus message or returns to the instance ready state 64a when receiving CCInstanceResultAck message.

Figure 6B:
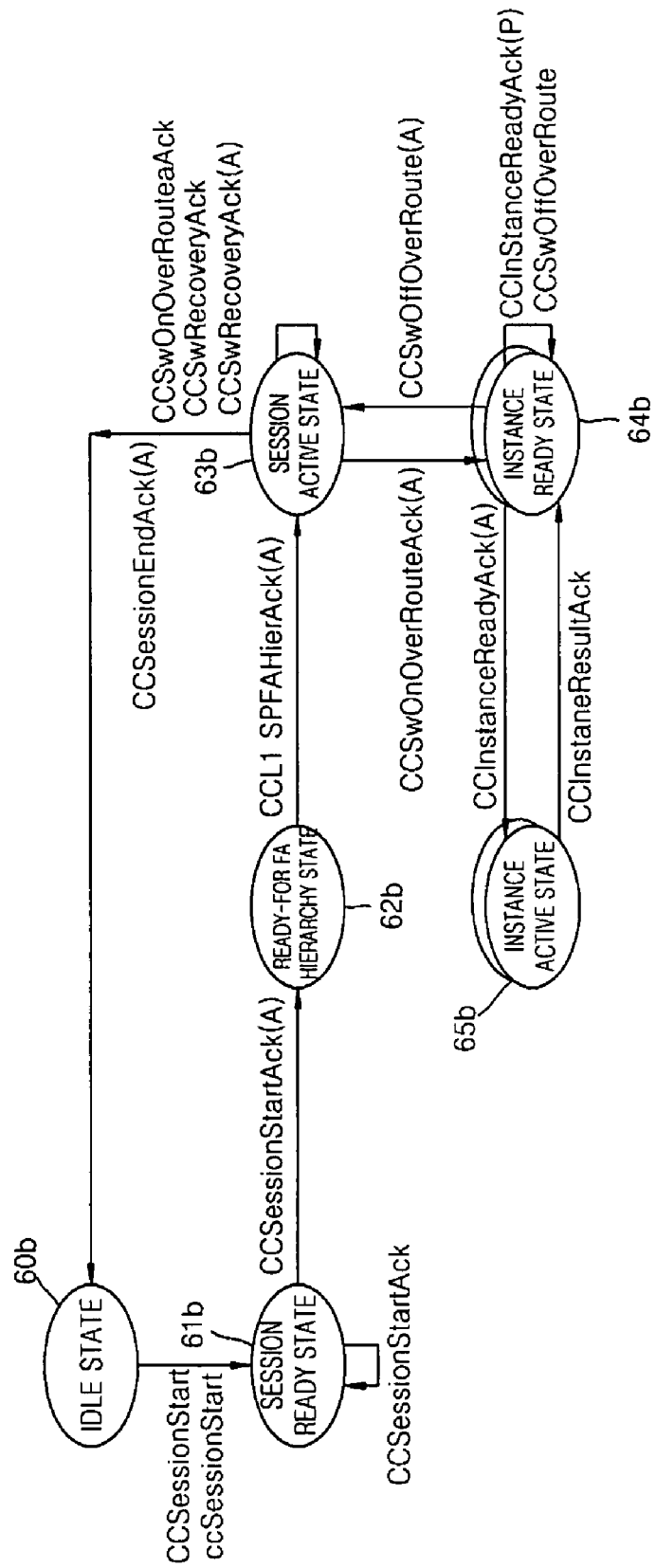

FIG. 6B is a state transition diagram of an a-UNI-N. Referring to FIG. 6B, the a-UNI-N includes an idle state 60b, a session ready state 61b, a ready-for FA hierarchy state 62b, a session active state 63b, an instance ready state 64b, and an instance active state 65b.

After receiving CCSessionStart or ccSessionStart in the idle state 60b, the a-UNI-N transits to the session ready state 61b. As described above, ccSessionStart is an event that is generated by a node itself in order to request the start of CC. In the session ready state 61b, the a-UNI-N maintains its current state after transmitting CCSessionStartAck to the a-UNI-C or transits to the ready-for FA hierarchy state 62b after receiving CCSessionStartAck from the a-UNI-C. While in the ready-for FA hierarchy state 62b, the a-UNI-N transits to the session active state 63b after receiving CL1LSPFAHierAck.

While in the session active state 63b, the a-UNI-N maintains its current state when receiving CCSwOnOverRouteAck or CCSwRecoveryAck or when receiving CCSwRecoveryAck from the a-UNI-C. In addition, the a-UNI-N transits to idle state 60b after receiving CCSessionEndAck from the a-UNI-C or transits to the instance ready state 64b after receiving CCSwOnOverRouteAck from the a-UNI-C.

While in the instance ready state 64b, the a-UNI-N maintains its current state when receiving CCInstanceReadyAck or CCSwOffOverRoute from the p-UNI-C. Furthermore, in the instance ready state 64b, the a-UNI-N transits to the instance active state 65b when receiving CCInstanceReadyAck from the a-UNI-C or returns to the session active state 63b after receiving CCSwOffoverRouteAck.

In the instance active state 65b, the a-UNI-N returns to the instance ready state 64b after receiving CCInstanceResultAck.

FIG. 6C is a state transition diagram of a p-UNI-N. Referring to FIG. 6C, the p-UNI-N includes an idle state 60c, a session ready state 61c, a ready-for FA hierarchy state 62c, and a session inactive state 66c.

In the idle state 60c, the p-UNI-N transits to the session ready state 61c after transmitting CCsessionStart to the p-UNI-C. While in the session ready state 61c, the p-UNI-N transits to the ready-for FA hierarchy state 62c when receiving CCSessionStartAck. While in the ready-for FA hierarchy state 62c, the p-UNI-N maintains its current state when transmitting CCL1LSPFAHier or transits to the session inactive state 66c after transmitting CCL1LSPFAHierAck to the a-UNI-N. While in the session inactive state 66c, the p-UNI-N maintains its current state when transmitting CCSwOnOverRoute, CCSwOffOverRoute, CCSwRecovery, or CCSessionEnd to the p-UNI-C, or transmitting CCSwOnOverRouteAck, CCSwOffOverRouteAck, or CCSwRecoveryAck to the a-UNI-N. Furthermore, while in the session inactive state 66c, the p-UNI-N transits to the idle state 60c when transmitting CCSessionEnd to the a-UNI-N.

Figure 6D:
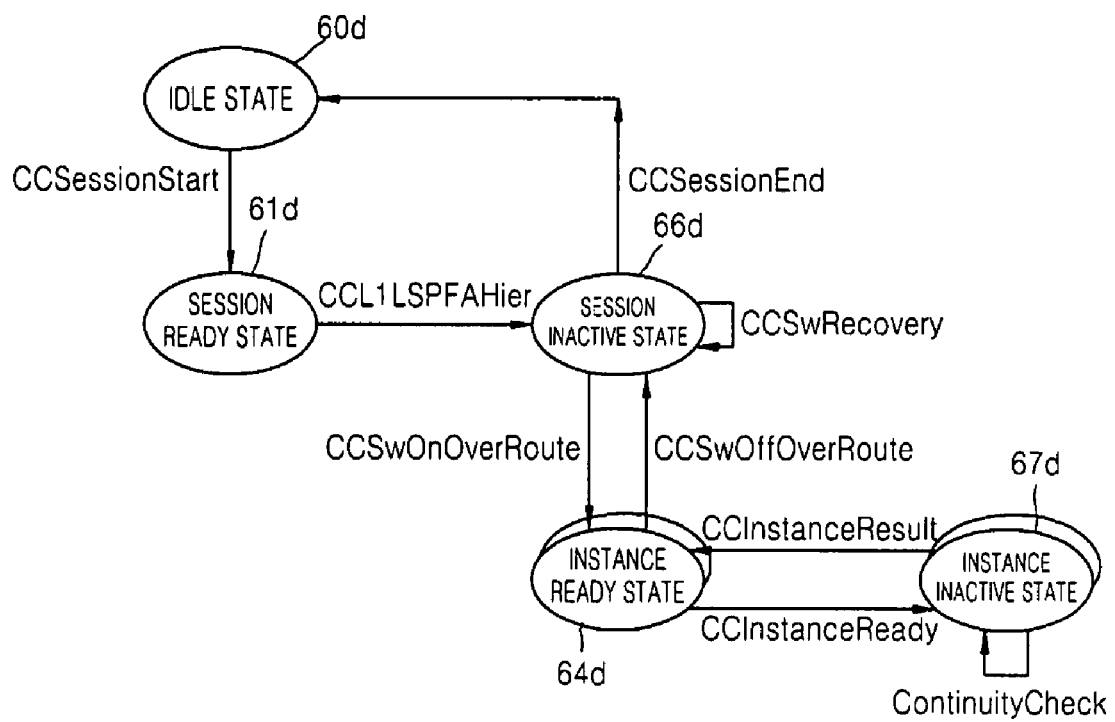

FIG. 6D is a state transition diagram of a p-UNI-C. Referring to FIG. 6D, the p-UNI-C includes an idle state 60d, a session ready state 61d, a session inactive state 66d, an instance ready state 64d, and an instance inactive state 67d.

In the idle state 60d, the p-UNI-C transits to the session ready state 61d when receiving CCsessionStart. In the session ready state 61d, the p-UNI-C transits to the session inactive state 66d after receiving CCL1LSPFAHier. While in the session inactive state 66d, the p-UNI-C maintains its current state when receiving CCSwRecovery or transits to the idle state 60d when receiving CCSessionEnd. Furthermore, while in the session inactive state 66d, the p-UNI-C transits to the instance ready state 64d after receiving CCSwOnOverRoute.

In the instance ready state 64d, the p-UNI-C returns to the session inactive state 66d when receiving CCSwOffRoute, or transits to the instance inactive state 67d when receiving CCInstanceReady. In the instance inactive state 67d, the p-UNI-C returns to the instance ready state 64d when receiving CCInstanceResult, or maintains its current state when receiving ContinuityCheck.

Figure 7A:
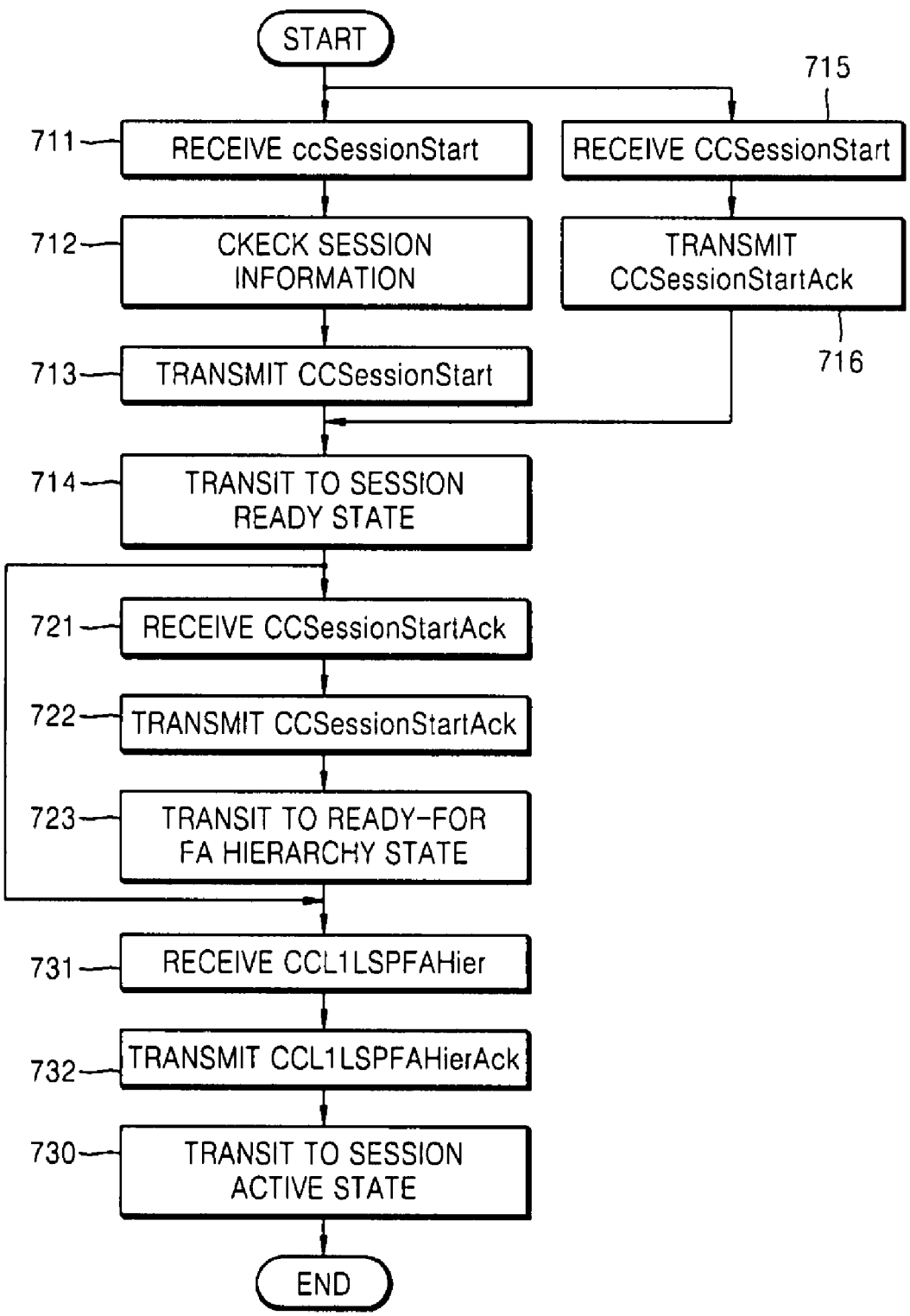
FIGS. 7A and 7B are flowcharts of operations performed when a client operates as an active-user-network-interface-client (a-UNI-C) for an L1-LSP connection confirmation.
Figure 7B:
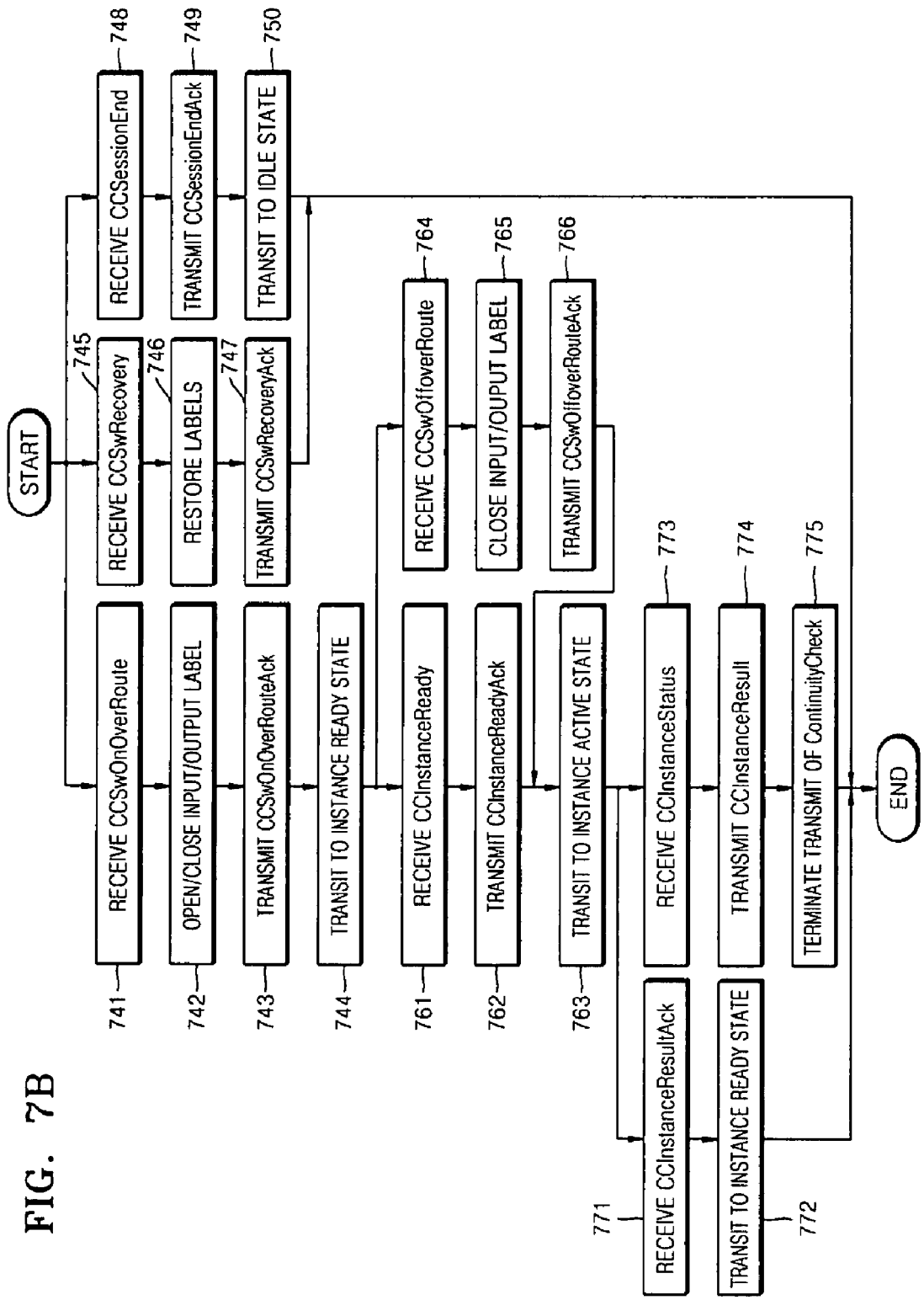

FIGS. 7A and 7B are flowcharts of operations performed when a client operates as an a-UNI-C for L1-LSP CC.

When receiving ccSessionStart, which is an internal event of a UNI-C that requests CC, in the idle state 60a (operation 711), the a-UNI-C checks session management information containing an identification (ID) (operation 712). The a-UNI-C transmits CCSessionStart to the a-UNI-C (operation 713), and then transits to the session ready state 61a (operation 714). After receiving CCSessionStart from the a-UNI-N in the session ready state 60a(operation 715), the a-UNI-C transmits CCSessionStartAck to the a-UNI-N (operation 716) and then transits to the session ready state 61a (operation 714).

In the session ready state 61a, the a-UNI-C receives CCSessionStartAck from the a-UNI-N (operation 721) and then re-transmits CCSessionStartAck to the a-UNI-N (operation 722). Then, the a-UNI-C transits to the ready-for FA hierarchy state 62a (operation 723).

Receiving CCL1LSPFAHier from the a-UNI-N in the session ready state 61a or in the ready-for FA hierarchy state 62a (operation 731), the a-UNI-C transmits CCL1LSPFAHierAck to the a-UNI-N (operation 732) and then transits to the session active state 63a (operation 733).

Receiving CCSwOnOverRoute from the a-UNI-N in the session active state 63a (operation 741), the a-UNI-C temporality opens or closes an associated input/output label (operation 741), and thereafter transmits CCSwOnOverRouteAck to the a-UNI-N (operation 743). Then, the a-UNI-C transits to the instance ready state 64a (operation 744).

Receiving CCSwRecovery from the a-UNI-N in the session active state 63a (operation 745), the a-UNI-C restores all initial labels (operation 746) and then transmits CCSwRecoveryAck to the a-UNI-N, maintaining the current state (operation 747).

Receiving CCSessionEnd from the a-UNI-N in the session active state 63a (operation 748), the a-UNI-C transmits CCSessionEndAck to the a-UNI-N (operation 749) and transits to the idle state 60a (operation 750).

Receiving CCInstanceReady from the a-UNI-N in the instance ready state 64a (operation 761), the a-UNI-C transmits CCInstanceReadyAck to the a-UNI-N (operation 762) and transits to the instance active state 65a (operation 763). In operations 761 and 762 and the instance ready state 64a, the a-UNI-C transmits ContinuityCheck periodically through a data channel.

Receiving CCSwOffoverRoute from the a-UNI-N in the instance ready state 64a (operation 764), the a-UNI-C closes the input/output label temporarily (operation 765), transmits CCSwOffoverRouteAck (operation 766) and then transits to the session active state 63a (operation 763).

Receiving CCInstanceResultAck from the a-UNI-N in the instance active state 65a (operation 771), the a-UNI-C transits to the instance ready state 64a (operation 772). Receiving CCInstanceStatus from the p-UNI-C in the instance active state 65a (operation 773), the a-UNI-C transmits CCInstanceResult to the a-UNI-N (operation 774), stops the periodic transmission of ContinuityCheck and maintains the current state (operation 775).

Figure 8A:
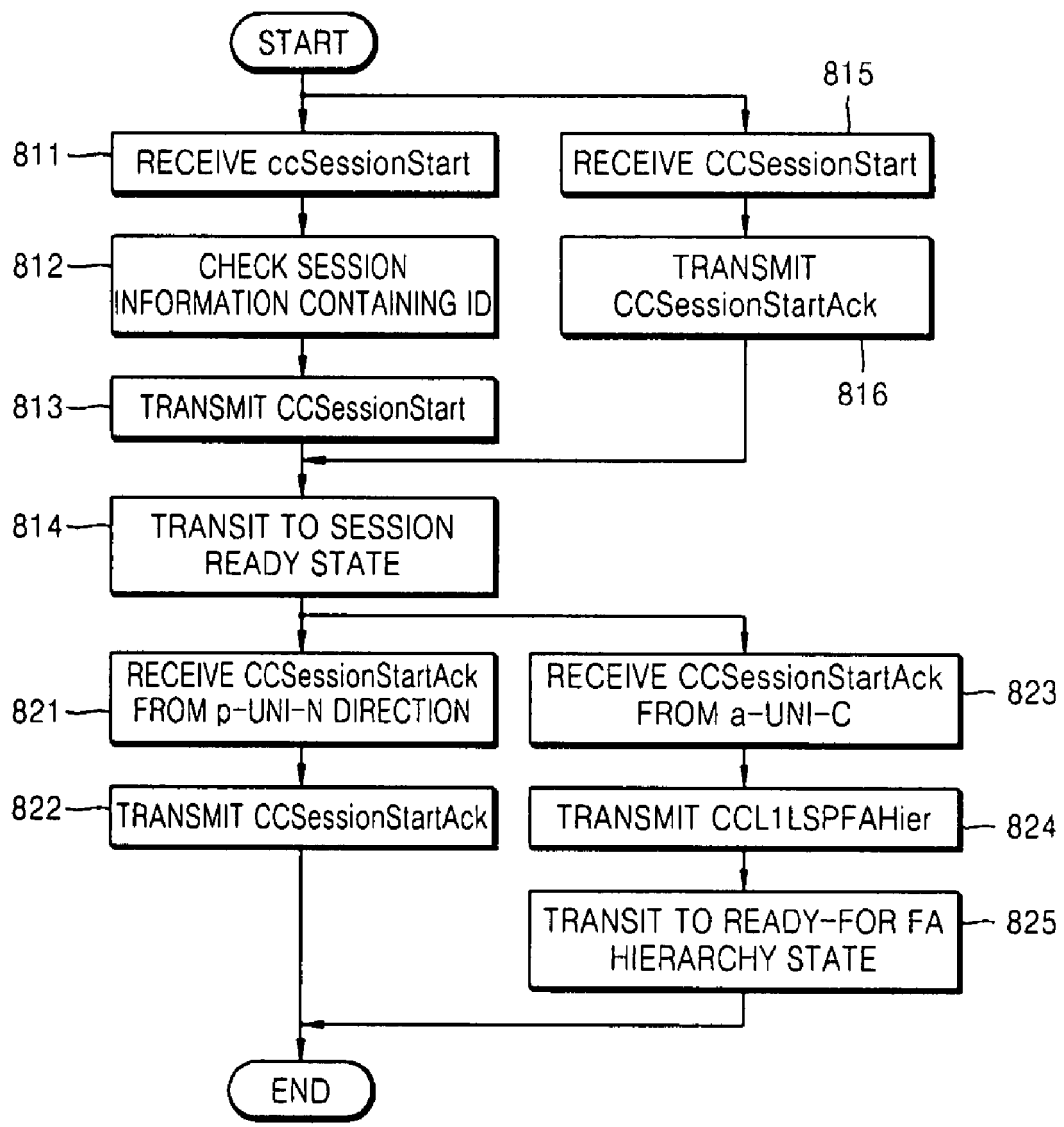
FIG. 8A is a flowchart of operations performed while in an idle state and a session ready state when a network node operates as an active-user-network-interface-network node (a-UNI-N)

FIG. 8A is a flowchart of operations performed in an idle state and a session ready state when a network node operates as an a-UNI-N.

Receiving ccSessionStart requesting CC, which is an event generated by a UNI-N node in the idle state 60b (operation 811), the a-UNI-N checks session management information containing an ID (operation 812), transmits CCSessionStart to the p-UNI-N direction (operation 813), and then transits to the session ready state 61b (operation 814).

Receiving CCSessionStart from the a-UNI-C while in the session ready state 60b (operation 815), the a-UNI-N transmits CCSessionStartAck to the p-UNI-N direction (operation 816) and transits to the session ready state 61b (operation 814).

Receiving CCSessionStartAck from the p-UNI-N direction while in the session ready state 61b (operation 821), the a-UNI-N transmits CCSessionStartAck to the a-UNI-C and maintains the current state (operation 822). Receiving CCSessionStartAck from the a-UNI-C while in the session ready state 61b (operation 823), the a-UNI-N transports CCL1LSPFAHier to the p-UNI-N direction (operation 824) and transits to the ready-for FA hierarchy state 62b (operation 825).

Figure 8B:
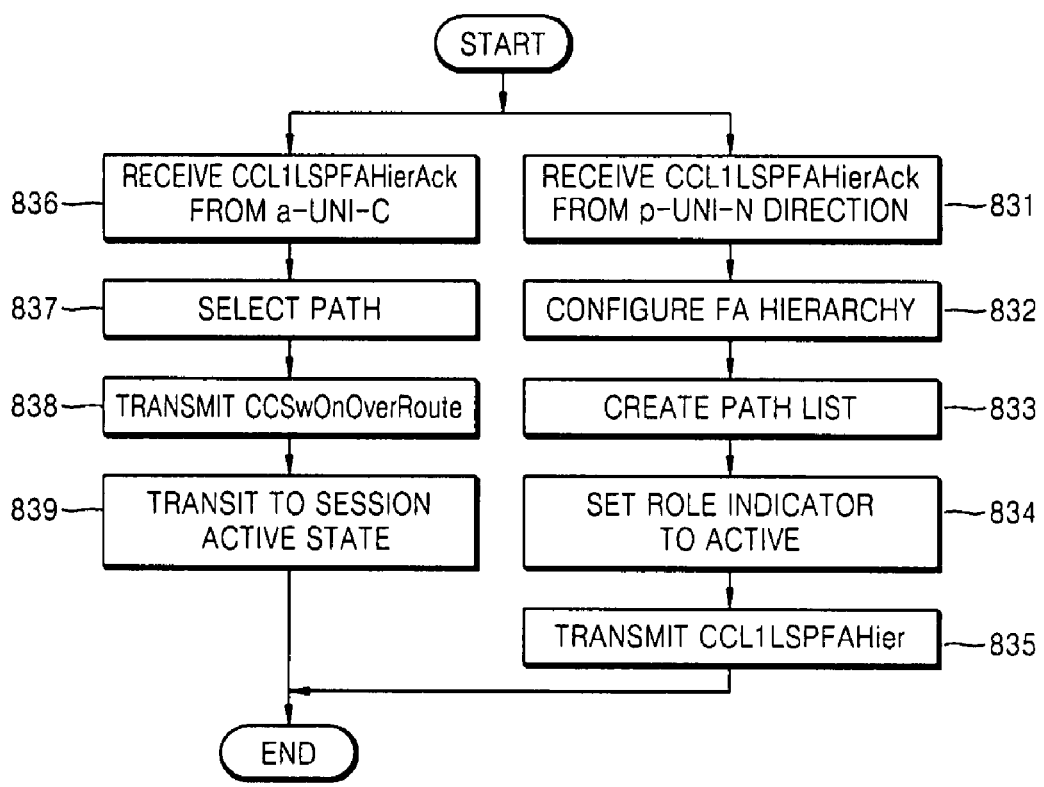
FIG. 8B is a flowchart of operations performed while in a ready-for forwarding adjacency (FA) hierarchy state when a network node operates as an a-UNI-N.

FIG. 8B is a flowchart of operations performed while in a ready-for FA hierarchy state when a network node operates as an a-UNI-N.

Receiving CCL1LSPFAHierAck from the p-UNI-N direction (operation 831) while in the ready-for FA hierarchy state 62b (operation 831), the a-UNI-N configures an FA hierarchy for a corresponding LSP (operation 832) and generates a list of a plurality of paths through which the a-UNI-N and the p-UNI-N are connected over the network (operation 833). In addition, the a-UNI-N sets a role indicator to active in order to indicate itself to be an active UNI-N as the network node (operation 834), transmits CCL1LSPFAHier to the a-UNI-N and then maintains the current state (operation 835).

Receiving CCL1LSPFAHierAck from the a-UNI-C while in the ready-for FA hierarchy state 62b (operation 836), the a-UNI-N selects one of the paths on the list for CC (operation 837), transmits CCSwOnOverRoute to the p-UNI-N direction through the selected path (operation 838) and transits to the session active state 63b (operation 839).

Figure 8C:
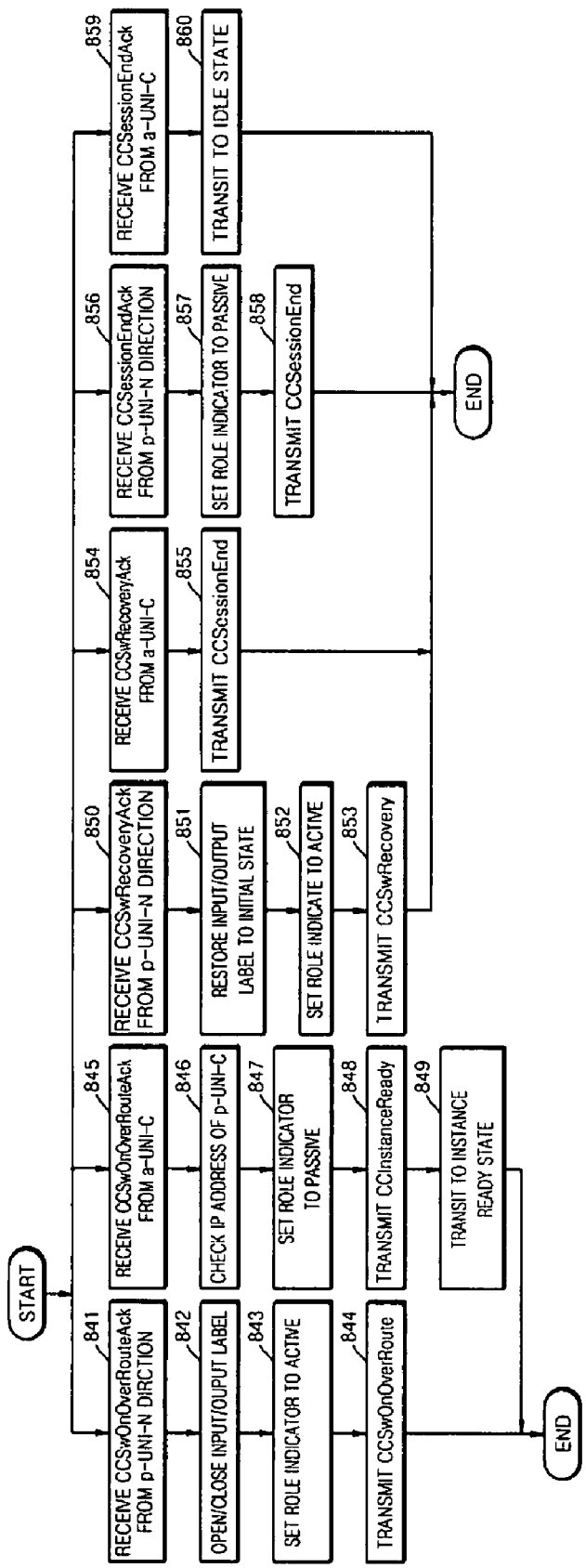
FIG. 8C is a flowchart of operations performed while in a session active state when a network node operates as an a-UNI-N.

FIG. 8C is a flowchart of operations performed while in a session active state when a network node operates as an a-UNI-N.

Receiving CCSwOnOverRouteAck from the p-UNI-N direction while in the session active state 63b (operation 841), the a-UNI-N temporarily opens or closes an input/output label (operation 842). In addition, the a-UNI-N sets a role indicator to active (operation 843), transmits CCSwOnOverRoute to the a-UNI-C, and maintains the current state (operation 844).

Receiving CCSwOnOverRouteAck from the a-UNI-C while in the session active state 63b (operation 845), the a-UNI-N checks the IP address of the p-UNI-C (operation 846). The a-UNI-N sets its role indicator to passive (operation 847), transmits CCInstanceReady the p-UNI-C (operation 848) and transits to the instance ready state 64b (operation 849).

Receiving CCSwRecoveryAck from the p-UNI-N direction while in the session active state 63b (operation 850), the a-UNI-N restores the input/output label to its initial state (operation 851) and sets the role indicator to active (operation 852). Then the a-UNI-N transmits CCSwRecovery to the a-UNI-C, and maintains the current state (operation 853).

Receiving CCSwRecoveryAck from the a-UNI-C while in the session active state 63b (operation 854), the a-UNI-N transmits CCSessionEnd to the p-UNI-N direction and maintains the current state (operation 855).

Receiving CCSessionEndAck from the p-UNI-N direction while in the session active state 63b (operation 856), the a-UNI-N sets the role indicator be passive (operation 857), transmits CCSessionEnd to the a-UNI-C and maintains the current state (operation 858).

Receiving CCSessionEndAck from the a-UNI-C while in the session active state 63b (operation 859), the a-UNI-N transits to the idle state 60b (operation 860).

Figure 8D:
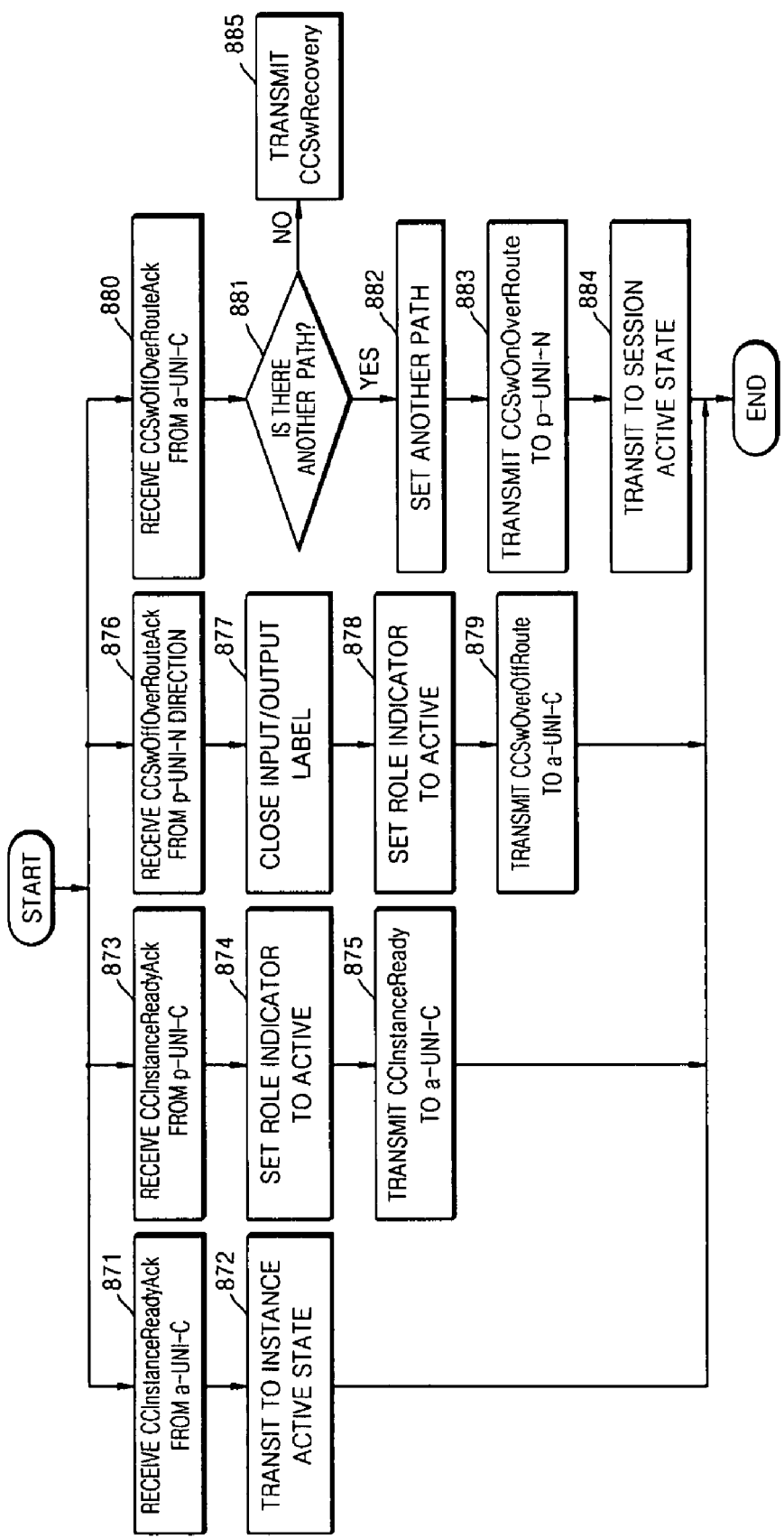
FIG. 8D is a flowchart of operations performed while in an instance ready state when a network node operates as an a-UNI-N.

FIG. 8D is a flowchart of operations performed while in an instance ready state when a network node operates as an a-UNI-N.

Receiving CCInstanceReadyAck from the a-UNI-C while in the instance ready state 64b (operation 871), the a-UNI-N transits to the instance active state 65b (operation 872).

Receiving CCInstanceReadyAck from the p-UNI-C while in the instance ready state 64b, (operation 873), the a-UNI-N sets the role indicator to active (operation 874), transmits CCInstanceReady to the a-UNI-C, and maintains the current state (operation 875).

Receiving CCSwOffOverRouteAck from the p-UNI-N direction while in the instance ready state 64b (operation 876), the a-UNI-N closes an associated input/output label temporarily (operation 877) and sets the role indicator to active (operation 878). Then, the a-UNI-N transmits CCSwOverOffRoute to the a-UNI-C and maintains the current state (operation 879).

Receiving CCSwOffOverRouteAck from the a-UNI-C while in the instance ready state 64b (operation 880), the a-UNI-N checks whether another path exists (operation 881). If the other path exists, the a-UNI-N sets the other path (operation 882), transmits CCSwOnOverRoute to the p-UNI-N direction (operation 883) and transits to the session active state 63b (operation 884). If the other path does not exist in operation 881, the a-UNI-N transmits CCSwRecovery to the p-UNI-N direction (operation 885) and transits to the session active state 63b (operation 884).

Figure 8E:
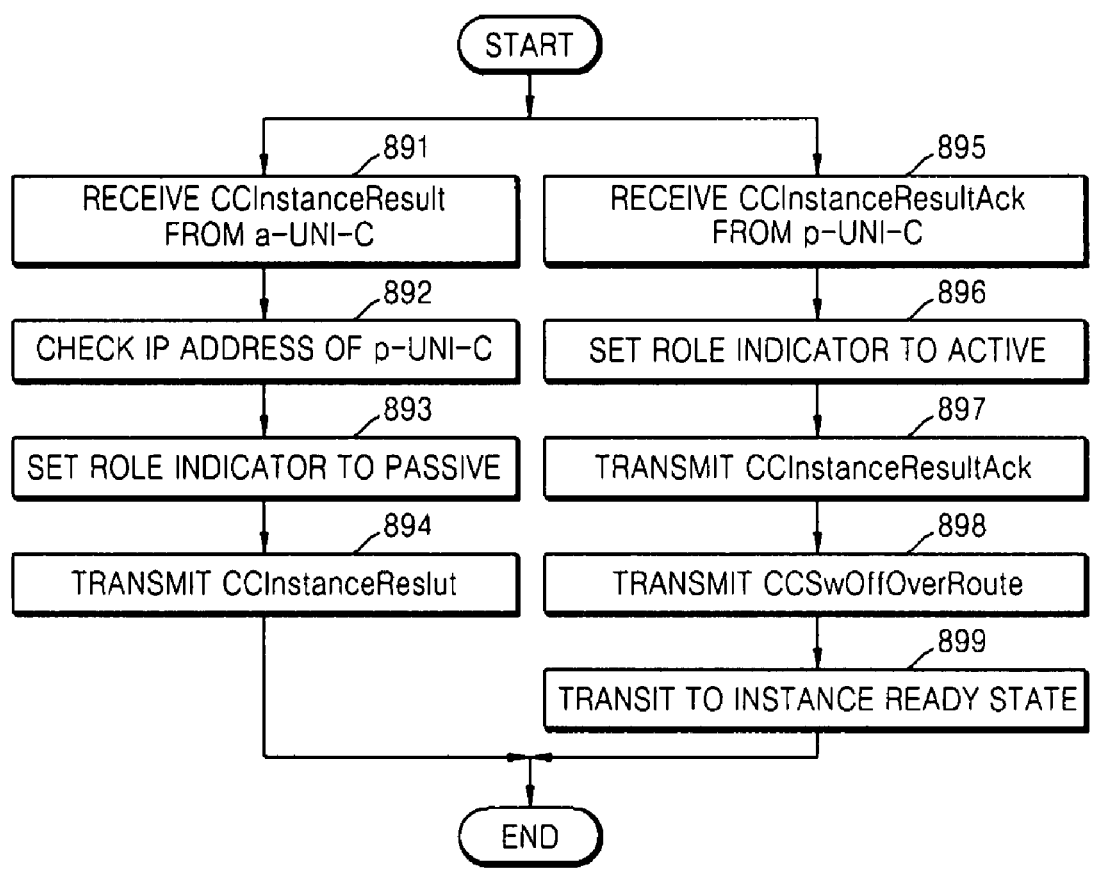
FIG. 8E is a flowchart of operations performed while in an instance active state when a network node operates as an a-UNI-N.

FIG. 8E is a flowchart of operations performed while in an instance active state when a network node operates as an a-UNI-N.

Receiving CCInstanceResult from the a-UNI-C while in the instance active state 65b (operation 891), the a-UNI-N checks the IP address of the p-UNI-C (operation 892) and sets a role indicator set to passive (operation 893). Then the a-UNI-N transmits CCInstanceResult to the p-UNI-C, and maintains the current state (operation 894).

Receiving CCInstanceResultAck from the p-UNI-C while in the instance active state 65b (operation 895), the a-UNI-N sets the role indicator to active (operation 896) and transmits CCInstanceResultAck to the a-UNI-C (operation 897). In addition, the a-UNI-N transmits CCSwOffOverRoute to the p-UNI-N direction (operation 898), and transits to the instance ready state 64b (operation 899).

Figure 9A:
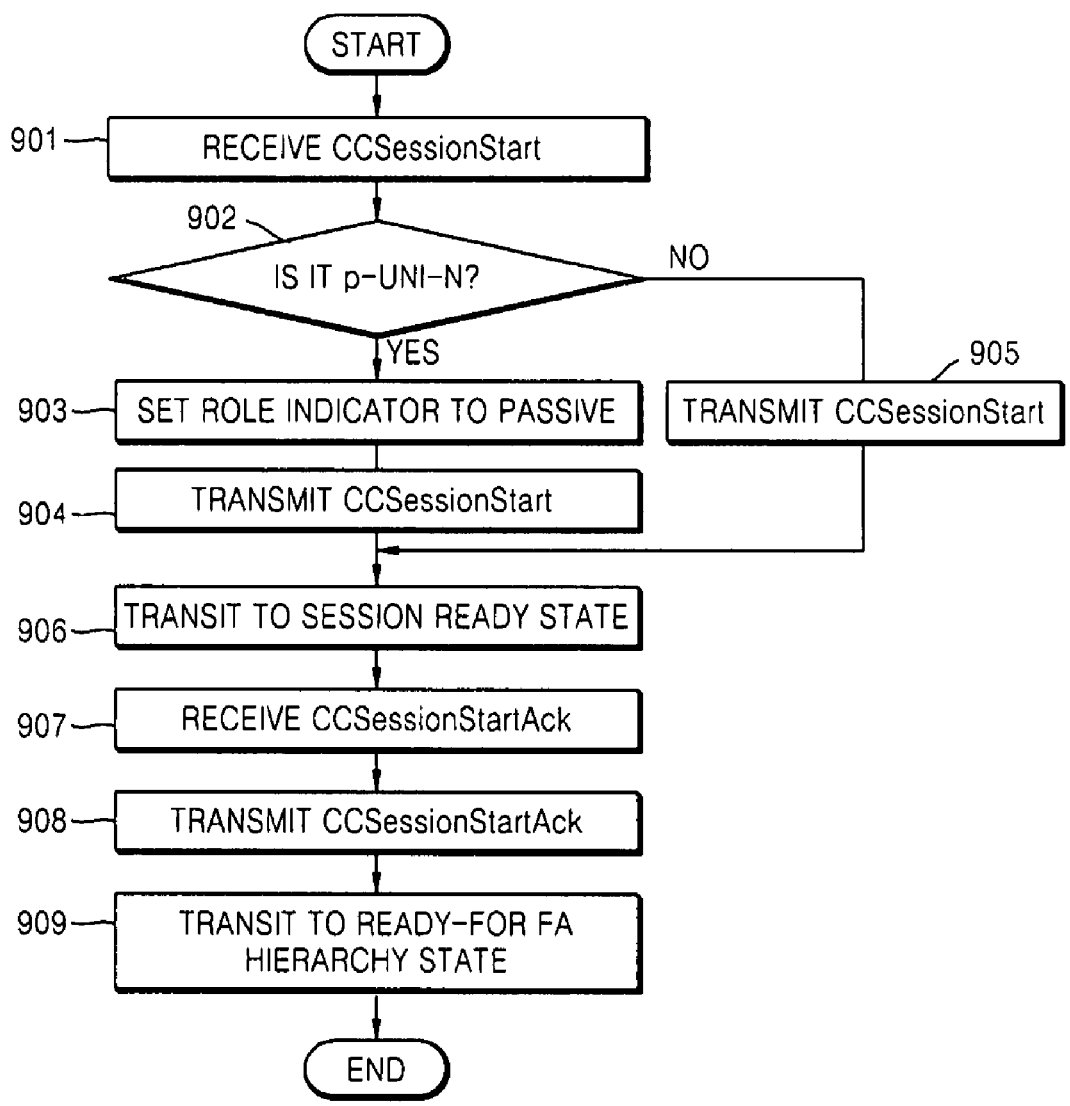
FIG. 9A is a flowchart of operations performed while in an idle state when a network node operates as an NNI-N or a passive-user-network-interface-network node (p-UNI-N)

FIG. 9A is a flowchart of operations performed while in an idle state when a network node operates as an NNI-N or a p-UNI-N.

Receiving CCSessionStart from the a-UNI-N while in the idle state 60c (operation 901), the network node checks whether it is the p-UNI-N (operation 902). If it is the p-UNI-N, the network node sets a role indicator to passive (operation 903), transmits CCSessionStart to the p-UNI-C (operation 904) and transits to the session ready state 61c (operation 906). If the network node is not the p-UNI-N in operation 902, the network node transmits CCSessionStart to the p-UNI-N direction (operation 905) and transits to the session ready state 61c (operation 906).

Receiving CCSessionStartAck from the p-UNI-N or the p-UNI-C while in the session ready state 61c (operation 907), the network node transmits CCSessionStartAck to the a-UNI-N direction (operation 908), and then transits to the ready-for FA hierarchy state 62c (operation 909).

Figure 9B:
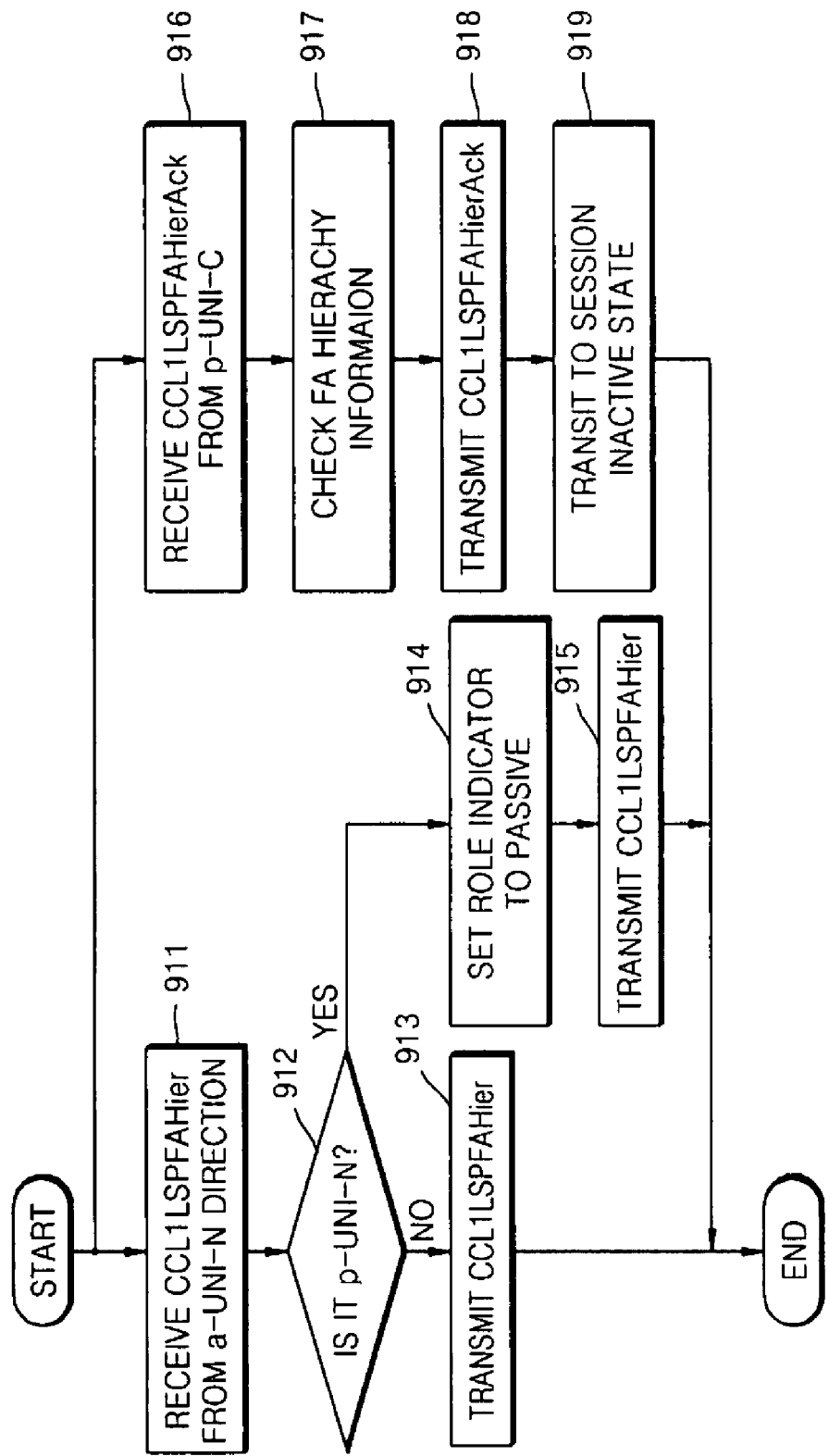
FIG. 9B is a flowchart of operations performed while in a ready-for FA hierarchy state when a network node operates as a network-network-interface-network node (NNI-N) or a p-UNI-N.
Figure 9C:
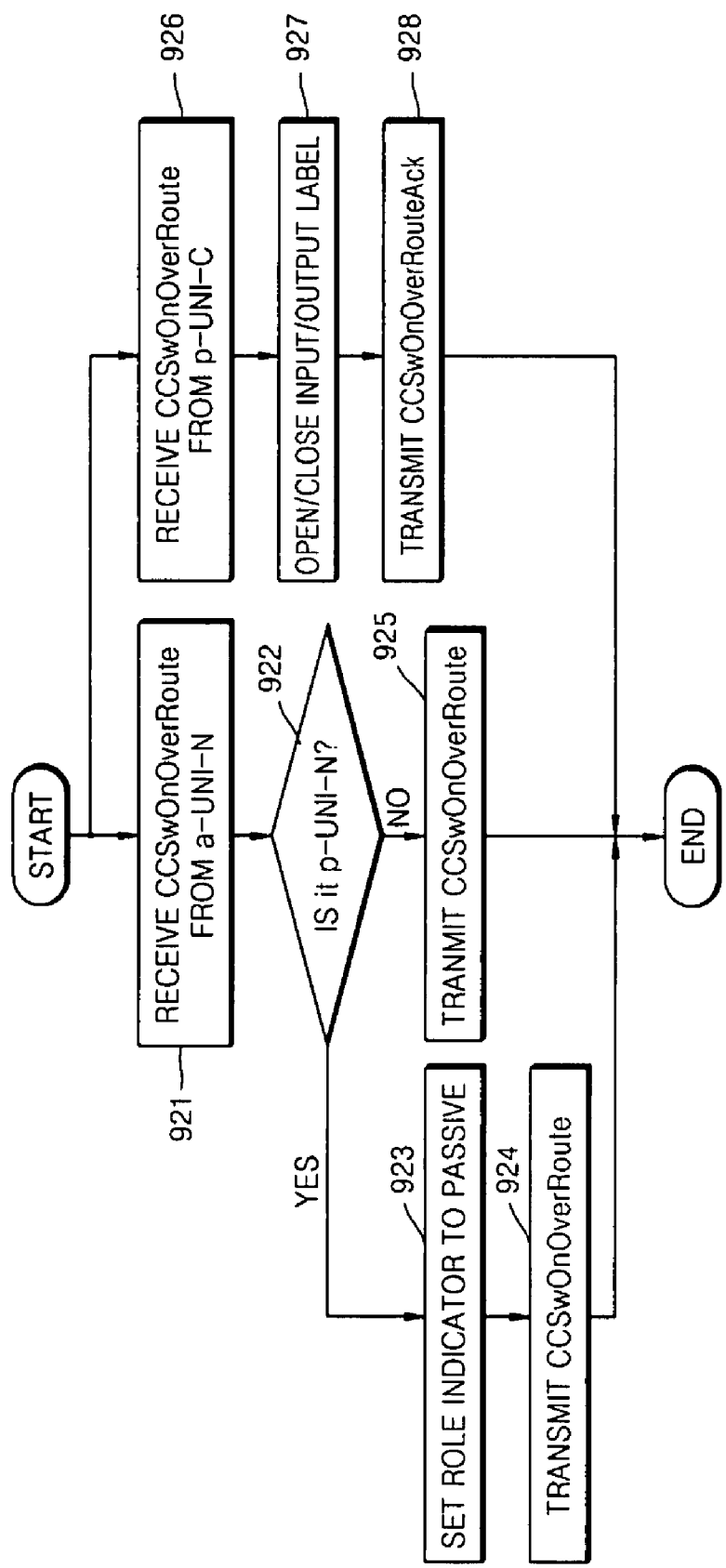
FIGS. 9C to 9F are flowcharts of procedures of operations performed while in a session inactive state when a network node operates as an NNI-N or a p-UNI-N.
Figure 9D:
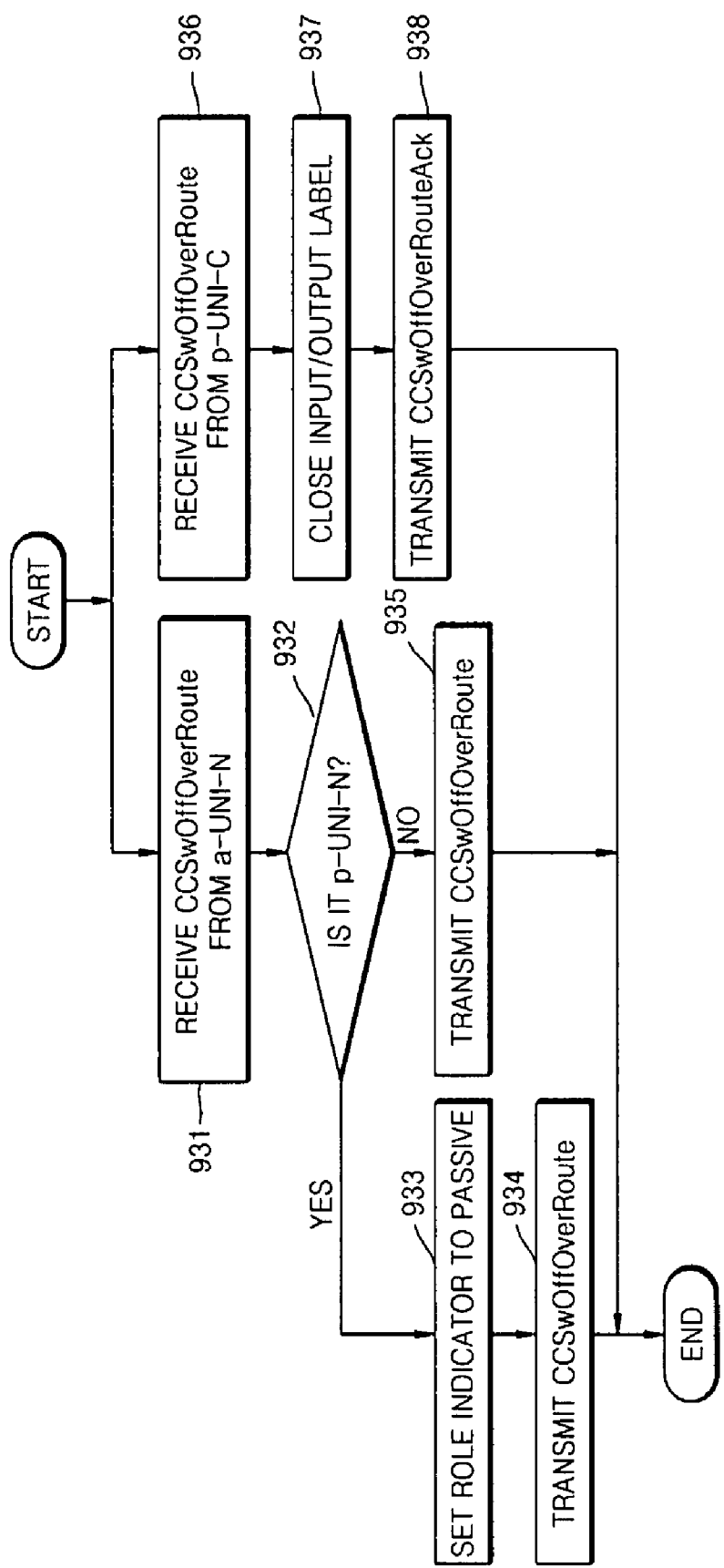
Figure 9E:
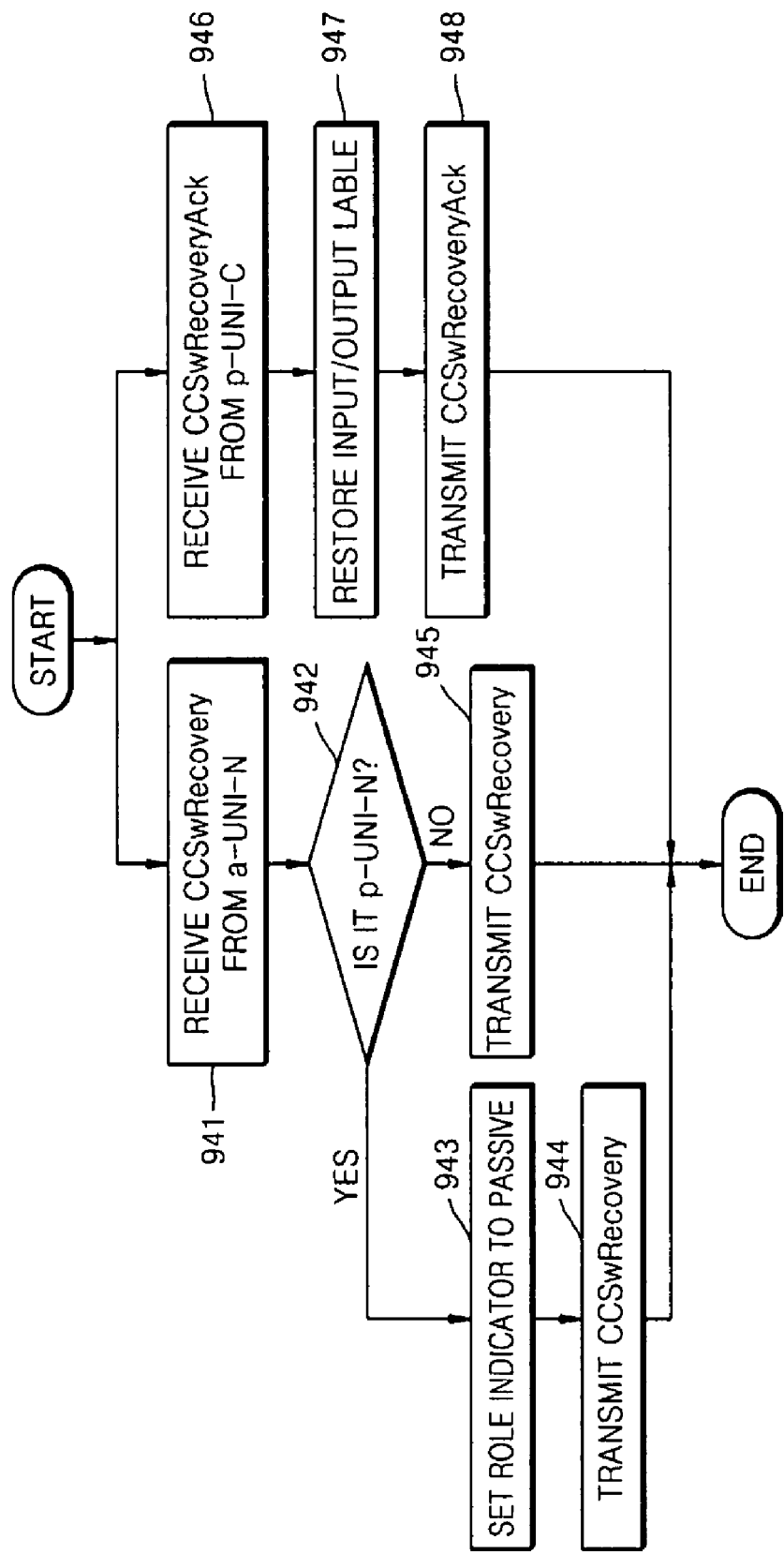
Figure 9F:
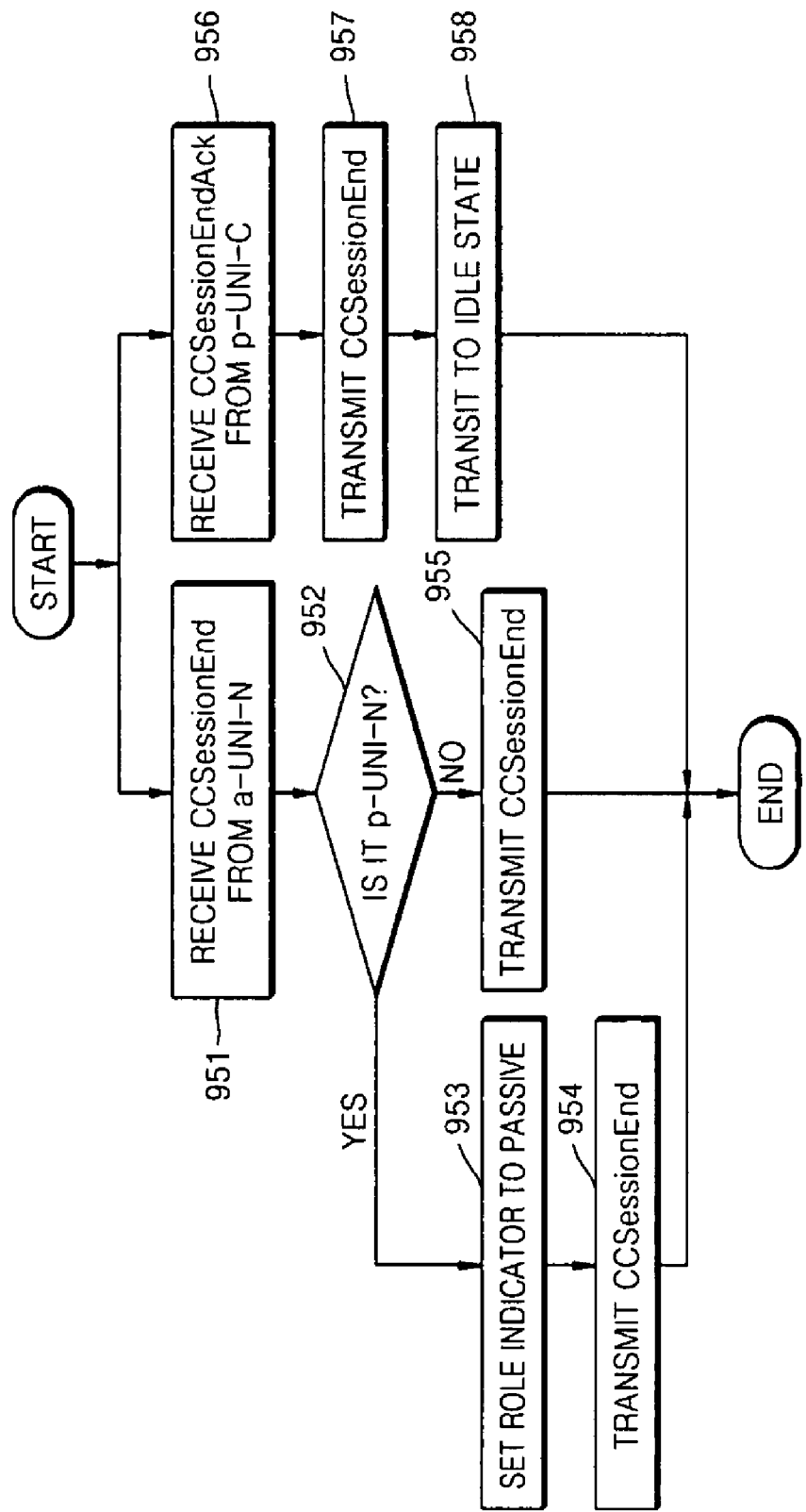

FIG. 9B is a flowchart of operations performed while in a ready-for FA hierarchy state when a network node operates as an NNI-N or a p-UNI-N.

Receiving CCL1LSPFAHier from the a-UNI-N while in the ready-for FA hierarchy state 62c (operation 911), the network node checks whether it is the p-UNI-N (operation 912). If it is not the p-UNI-N, the network node transmits CCL1LSPFAHier to the p-UNI-N direction, and maintains the current state (operation 913). If it is the p-UNI-N, the network node sets a role indicator to passive (operation 914), transmits CCL1LSPFAHier to the p-UNI-C, and maintains the current state (operation 915).

Receiving CCL1LSPFAHierAck from the p-UNI-C while in the ready-for FA hierarchy state 62c (operation 916), the network node checks FA hierarchy information (operation 917). This information contains a switch type such as TDM, LSC, and FSC, an input/output label, and an associated node list. Thereafter, the network node transmits CCL1LSPFAHierAck to the a-UNI-N direction (operation 918), and transits to the session inactive state 66c (operation 919).

FIGS. 9C to 9F are flowcharts of procedures of operations performed while in a session inactive state when a network node operates as an NNI-N or a p-UNI-N.

Receiving CCSwOnOverRoute from the a-UNI-N while in the session inactive state 66c (operation 921), the network node checks whether it is the p-UNI-N (operation 922). If it is the p-UNI-N, the network node sets a role indicator to passive (operation 923), transmits CCSwOnOverRoute to the p-UNI-C, and maintains the current state (operation 924). If it is not the p-UNI-N, the network node transmits CCSwOnOverRoute to the p-UNI-N direction, and maintains the current state (operation 925).

Receiving CCSwOnOverRoute from the p-UNI-C while in the session inactive state 66c (operation 926), the network node temporarily opens or closes an associated input/output label (operation 927). Then, the network node transmits CCSwOnOverRouteAck to the a-UNI-N direction, and maintains the current state (operation 928).

Receiving CCSwOffOverRoute from the a-UNI-N while in the session inactive state 66c (operation 931), the network node checks whether it is the p-UNI-N (operation 932). If it is the p-UNI-N, the network node sets the role indicator to passive (operation 933), transmits CCSwOffOverRoute to the p-UNI-C, and maintains the current state (operation 934). If it is not the p-UNI-N, the network node transmits CCSwOffOverRoute to the p-UNI-N direction, and maintains the current state (operation 935).

Receiving CCSwOffOverRoute from the p-UNI-C while in the session inactive state 66c (operation 936), the network node temporarily closes the associate input/output label (operation 937). Then, the network node transmits CCSwOffOverRouteAck to the a-UNI-N direction, and maintains the current state (operation 938).

Receiving the CCSwRecovery from the a-UNI-N while in the session inactive state 66c (operation 941), the network node checks whether it is the p-UNI-N (operation 942). If it is the p-UNI-N, the network node sets the role indicator to passive (operation 943), transmits CCSwRecovery is transmitted to the p-UNI-C, and maintains the current state (operation 944). If it is not the p-UNI-N, the network node transmits CCSwRecovery to the p-UNI-N direction (operation 945).

Receiving CCSwRecoveryAck from the p-UNI-C while in the session inactive state 66c (operation 946), the network node restores all input/output labels (operation 947). Then, the network node transmits CCSwRecoveryAck to the a-UNI-N direction, and maintains the current state (operation 948).

Receiving CCSessionEnd from the a-UNI-N while in the session inactive state 66c (operation 951), the network node checks whether it is the p-UNI-N (operation 952). If it the p-UNI-N, the network node sets the role indicator to passive (operation 953). Then, the network node transmits CCSessionEnd to the p-UNI-C, and maintains the current state (operation 954). If it is not the p-UNI-N, the network node transmits CCSessionEnd to the p-UNI-N direction, and maintains the current state (operation 955).

Receiving CCSessionEndAck from the p-UNI-C while in the session inactive state 66c (operation 956), the network node transmits CCSessionEnd to the a-UNI-N direction (operation 957) and transits to the idle state 60c (operation 958).

Figure 10A:
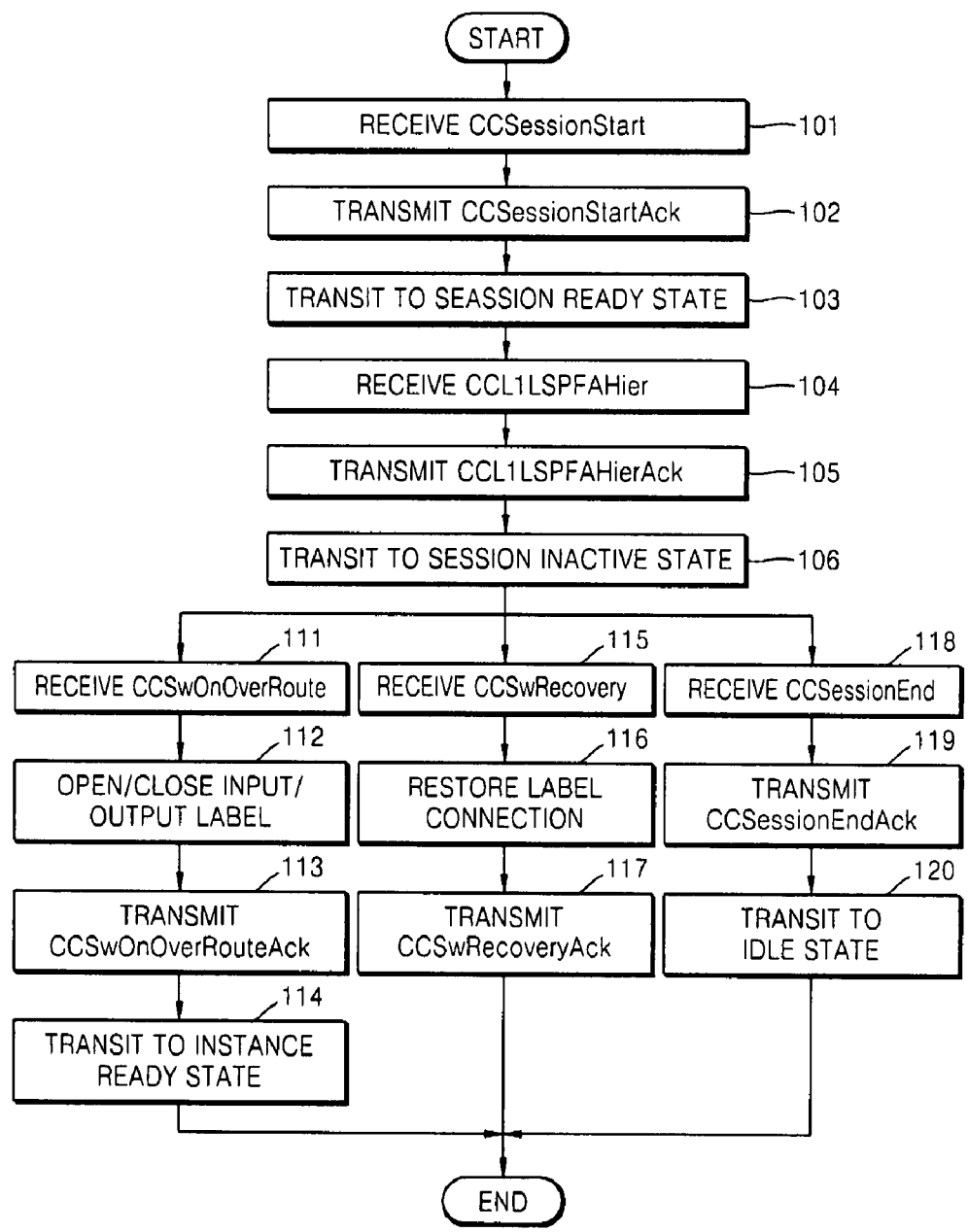
FIG. 10A is a flowchart of operations performed while in an idle state when a client operates as a p-UNI-C.

FIG. 10A is a flowchart of operations performed while in an idle state when a client operates as a p-UNI-C.

Receiving CCSessionStart from the p-UNI-N while in the idle state 60d (operation 101), the p-UNI-C transmits CCSessionStartAck to the p-UNI-N (operation 102), and transits to the session ready state 61d (operation 103). Receiving CCL1LSPFAHier from the p-UNI-N while in the session ready state 61d (operation 104), the p-UNI-C transmits CCL1LSPFAHierAck to the p-UNI-N (operation 105), and transits to the session inactive state 66d (operation 106).

Receiving CCSwOnOverRoute from the p-UNI-N while in the session inactive state 66d (operation 111), the p-UNI-C temporarily opens or closes an associated input/output label (operation 112). Thereafter, the p-UNI-C transmits CCSwOnOverRouteAck to the p-UNI-N (operation 113) and transits to the instance ready state 64d (operation 114).

Receiving CCSwRecovery from the p-UNI-N while in the session inactive state 66d (operation 115), the p-UNI-C restores all labels to their initial state (operation 116), transmits CCSwRecoveryAck to the p-UNI-N and maintains the current state (operation 117).

Receiving CCSessionEnd from the p-UNI-N while in the session inactive state 66d (operation 118), the p-UNI-C transmits CCSessionEndAck to the p-UNI-N (operation 119), and transits to the idle state 60d (operation 120).

Figure 10B:
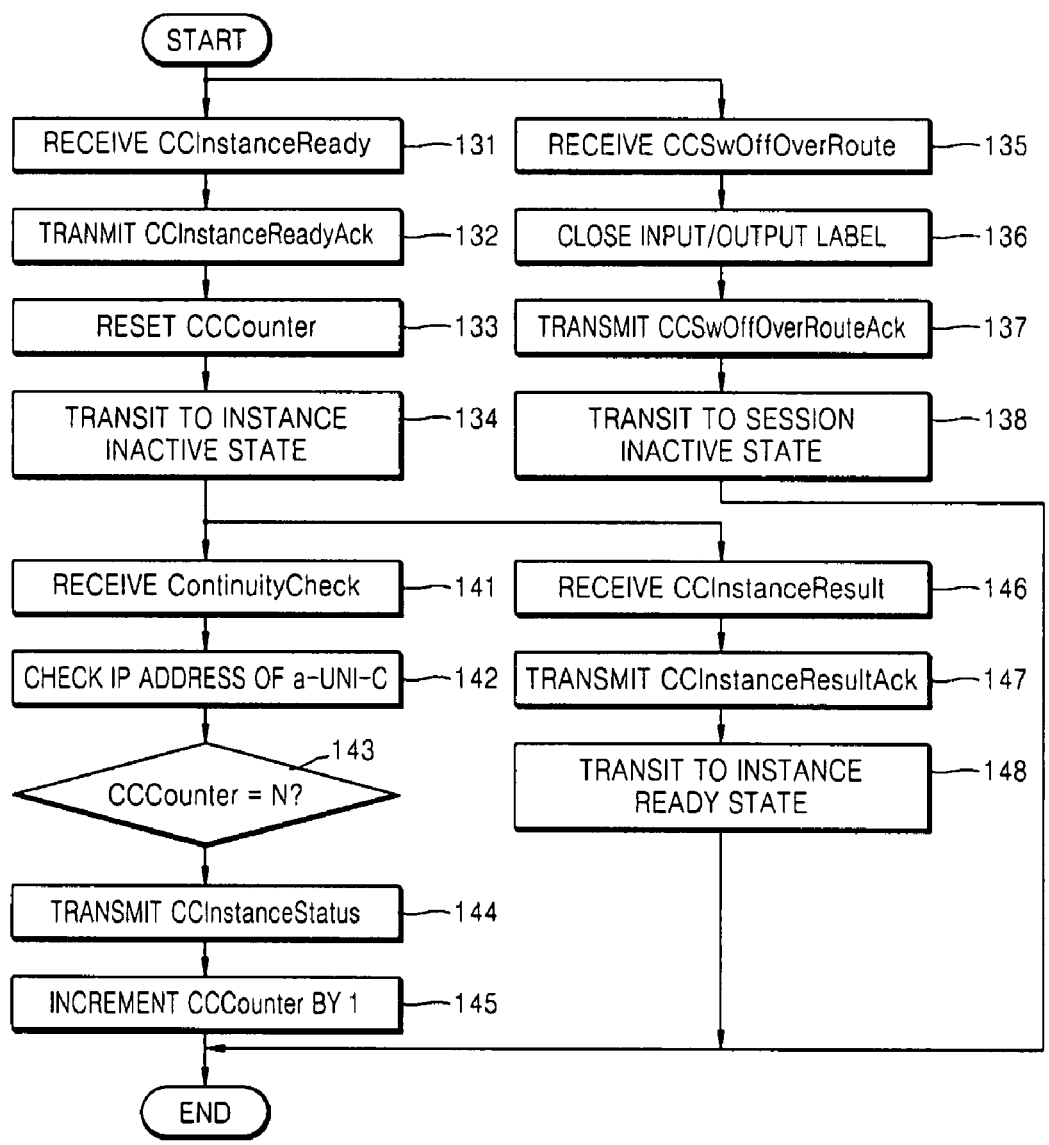
FIG. 10B is a flowchart of operations performed while in an instance ready state when a client operates as a p-UNI-C.

FIG. 10B is a flowchart of operations performed while in an instance ready state when a client operates as a p-UNI-C.

Receiving CCInstanceReady from the a-UNI-N while in the instance ready state 64d (operation 131), the p-UNI-C transmits CCInstanceReadyAck to the a-UNI-N (operation 132). Thereafter, the p-UNI-C resets CCCounter, which indicates how many times CCInstanceStatus has been transmitted, (operation 13) and transits to the instance inactive state 67d (operation 134).

Receiving CCSwOffOverRoute from the p-UNI-N while in the instance ready state 64d (operation 135), the p-UNI-C temporarily closes an input/output label (operation 136), transmits CCSwOffOverRouteAck to the p-UNI-N (operation 137), and then transits to the session inactive state 66d (operation 138).

Receiving ContinuityCheck while in the instance inactive state 67d (operation 141), the p-UNI-C checks an IP address of the a-UNI-C (operation 142) and then checks CCCounter (operation 143). If CCCounter does not exceed N (where N is a natural number), preferably 3, in operation 143, the p-UNI-N transmits CCInstanceStatus to the a-UNI-C (operation 144), increments CCCounter by 1, and maintains the current state (operation 145). If CCCounter exceeds N in operation 143, the p-UNI-C terminates CCInstanceStatus transmission.

Receiving CCInstanceResult received from the a-UNI-N while in the instance inactive state 67d (operation 146), the p-UNI-C transmits CCInstanceResultAck to the a-UNI-N (operation 147) and transits to the instance ready state 64d (Operation 148).

According to the present invention, a network administrator or protocol machine can perform a connection confirmation for validation of a path for a preset layer 1 (L1)-label switched path (LSP) itself dynamically through the interaction of a client with a network node in a global multi-protocol label switching (GMPLS)-based network, irrespective of a predetermined transport technique. In addition, since either the client or the network node can request the path validation, the connection confirmation can be performed with consistency regardless of the location from which the connection confirmation is requested.

The invention can also be embodied as computer readable code on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, and carrier waves (such as data transmission through the Internet). The computer readable recording medium can also be distributed over network coupled computer systems so that the computer readable code is stored and executed in a distributed fashion.

While the present invention has been particularly shown and described with reference to exemplary embodiments thereof, it will be understood by those skilled in the art that various changes in form and detail may be made therein without departing from the spirit and scope of the present invention as defined by the appended claims.

What is claimed is:

1. A method of confirming an LSP (label switched path) connection by a source client in a GMPLS (global multi-protocol label switching)-based network through which the source client and a destination client are connected, the method comprising:

transiting to a session ready state when receiving a message requesting a connection confirmation in an idle state;

transmitting an acknowledgement message for the message requesting the connection confirmation to the GMPLS network in the session ready state and transiting to a ready-for FA (forwarding adjacency) hierarchy state;

transiting to a session active state when receiving a message requesting a collection of information on the LSP in the session ready state or the ready-for FA hierarchy state;

opening or closing input/output labels and transiting to an instance ready state when receiving a first message requesting switching control for labels in the session active state;

transiting to an instance active state when receiving a message requesting preparation of the connection confirmation in the instance ready state;

transmitting a result of the connection confirmation to the GMPLS network when receiving a packet for the connection confirmation in the instance active state.

2. The method of claim 1, further comprising opening or closing input/output labels and transiting to the session active state when receiving a second message requesting switching control for labels in the instance ready state.

3. A method of confirming an LSP (label switched path) connection by a first network node connected to a source client of network nodes included in a GMPLS (global multi-protocol label switching)-based network through which the source client and a destination client are connected, the method comprising:

transiting to a session ready state when receiving a message requesting a connection confirmation in an idle state;

transmitting a message requesting collection of information on the LSP to a direction of a second network node connected to the destination client in the session ready state and then transiting to a ready-for FA (forwarding adjacency) hierarchy state;

selecting a path for the connection confirmation in the ready-for FA hierarchy state, transmitting a message which requests switching control for labels associated with the connection confirmation for the selected path, to the second network node direction and transiting to a session active state;

checking an IP (Internet protocol) address of the destination client, transmitting a message requesting preparation of the connection confirmation to the destination client, and transiting to an instance ready state, when receiving a first message for acknowledging the request for switching control for labels associated with the selected path from the source client in the session active state;

transiting to an instance active state when receiving a message for acknowledging the preparation of the connection confirmation in the instance ready state; and checking an IP address of the destination client and transmitting a result of the connection confirmation to the destination client when receiving the result of the connection confirmation in the instance active state.

4. The method of claim 3, further comprising configuring an FA hierarchy for the LSP in the ready-for FA hierarchy state, generating a path list and selecting a path from the generated path list, before the selecting of a connection confirmation path.

5. The method of claim 3, further comprising selecting another path, transmitting a message which requests switching control for labels associated with the selected path to the second network node direction, and transiting to the session active state, when receiving a second message acknowledging the request for switching control for labels associated with the selected path in the instance ready state.

6. A method of confirming an LSP (label switched path) connection by network nodes included in a GMPLS (global multi-protocol label switching)-based network through which a source client and a destination client are connected, the method comprising:

transiting to a session ready state when receiving a message requesting a connection confirmation in an idle state;

transiting to a ready-for FA (forwarding adjacency) hierarchy state when receiving an acknowledgement message in response to the message requesting the connection confirmation in the session ready state;

checking FA hierarchy information and transiting to a session inactive state when receiving an acknowledgement message for a request for collecting information on the LSP in the session ready state or the ready-for FA hierarchy state; and when receiving a message for requesting switching control for the connection confirmation from a first network node connected to the source client in the session inactive state, checking whether one receiving the message is a second network node connected to the destination client and transmitting the message for requesting switching control for the connection confirmation to the destination client if checked to be the second network node.

7. A method of confirming an LSP (label switched path) connection by a destination client in a GMPLS (global multi-protocol label switching)-based network through which a source client and the destination client are connected, the method comprising:

transiting to a session ready state when receiving a message requesting a connection confirmation in an idle state;

transiting to a session inactive state when receiving a message requesting collection of information on the LSP in the session ready state;

opening or closing input/output labels and transiting to an instance ready state if receiving a first message, which requests switching control for the connection confirmation, in the session inactive state;

transiting to an instance inactive state when receiving a message which requests preparation of the connection confirmation in the instance ready state;

when receiving a packet for the connection confirmation in the instance inactive state, checking an IP (Internet protocol) address of the source client and transmitting a message acknowledging reception of the packet for a predetermined number of times to the source client.

8. The method of claim 7, further comprising closing associated input/output labels and transiting to the session inactive state when a second message, which requests switching control for the connection confirmation, is received in the instance ready state.

9. The method of claim 7, further comprising, when a result of the connection confirmation is received in the instance inactive state, transmitting an acknowledge message for the result of the connection confirmation to a network node connected to the source client and transiting to the instance ready state.

* * * * *